US007020100B2

(12) United States Patent
Amatsubo et al.

(10) Patent No.: US 7,020,100 B2
(45) Date of Patent: Mar. 28, 2006

(54) HYPERFRAME SYNCHRONIZATION PROCESSING APPARATUS AND HYPERFRAME SYNCHRONIZATION METHOD

(75) Inventors: Takanao Amatsubo, Kawasaki (JP); Joji Fujiyama, Inagi (JP); Yasumasa Kikunaga, Hino (JP); Kenji Mihira, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1152 days.

(21) Appl. No.: 09/842,866

(22) Filed: Apr. 27, 2001

(65) Prior Publication Data

US 2001/0043620 A1 Nov. 22, 2001

(30) Foreign Application Priority Data

Apr. 28, 2000 (JP) ............................ 2000-130548

(51) Int. Cl.
*H04J 3/06* (2006.01)

(52) U.S. Cl. ...................................... 370/294; 370/503

(58) Field of Classification Search ................ 370/503, 370/507, 509, 510, 512

See application file for complete search history.

(56) References Cited

U.S. PATENT DOCUMENTS

| | | | | |
|---|---|---|---|---|
| 5,557,614 | A * | 9/1996 | Sandler et al. | 370/509 |
| 5,608,734 | A | 3/1997 | Sandler et al. | |
| 5,621,773 | A | 4/1997 | Varma et al. | |
| 5,883,929 | A | 3/1999 | Wang et al. | |
| 2002/0008525 | A1* | 1/2002 | Seagraves et al. | 324/500 |

FOREIGN PATENT DOCUMENTS

JP 10-303843 11/1998

* cited by examiner

*Primary Examiner*—Huy D. Vu
*Assistant Examiner*—Daniel Ryman
(74) *Attorney, Agent, or Firm*—Oblon, Spivak, McClelland, Maier & Neustadt, P.C.

(57) ABSTRACT

In hyperframe synchronization processing of a hyperframe including FEXT frames and NEXT frames, each difference between the number of consecutive FEXT frames and the number of consecutive NEXT frames is calculated, and a unique sequence of these differences is detected. When the unique sequence of differences can be detected from a received hyperframe, the position of a frame which is being received now in the hyperframe can be specified at that point in time. Hence, hyperframe synchronization can be established in a short time after frame synchronization is established.

24 Claims, 25 Drawing Sheets

| LINE | FEXT | NEXT |
|---|---|---|
| 0 | 4 | 7 |
| 1 | 4 | 7 |
| 2 | 4 | 7 |
| 3 | 4 | 6 |
| 4 | 4 | 7 |
| 5 | 4 | 7 |
| 6 | 4 | 7 |
| 7 | 4 | 7 |
| 8 | 4 | 6 |
| 9 | 4 | 7 |
| 10 | 4 | 7 |
| 11 | 4 | 7 |
| 12 | 4 | 6 |
| 13 | 5 | 6 |
| 14 | 4 | 7 |
| 15 | 4 | 7 |
| 16 | 4 | 7 |
| 17 | 4 | 6 |
| 18 | 4 | 7 |
| 19 | 4 | 7 |
| 20 | 4 | 7 |
| 21 | 4 | 6 |
| 22 | 5 | 6 |
| 23 | 4 | 7 |
| 24 | 4 | 7 |
| 25 | 4 | 7 |
| 26 | 4 | 6 |
| 27 | 4 | 7 |
| 28 | 4 | 7 |
| 29 | 4 | 7 |
| 30 | 4 | 7 |
| 31 | 4 | 6 |

FIG. 1

| LINE | FEXT | NEXT | DIFFERENCE |
|---|---|---|---|
| 0.0 | 4 | 7 | -3 |
| 1.0 | 4 | 7 | -3 |
| 2.0 | 4 | 7 | -3 |
| 3.0 | 4 | 6 | -2 |
| 4.0 | 4 | 7 | -3 |
| 5.0 | 4 | 7 | -3 |
| 6.0 | 4 | 7 | -3 |
| 7.0 | 4 | 7 | -3 |
| 8.0 | 4 | 6 | -2 |
| 9.0 | 4 | 7 | -3 |
| 10.0 | 4 | 7 | -3 |
| 11.0 | 4 | 7 | -3 |
| 12.0 | 4 | 6 | -2 |
| 13.0 | 5 | 6 | -1 |
| 14.0 | 4 | 7 | -3 |
| 15.0 | 4 | 7 | -3 |
| 16.0 | 4 | 7 | -3 |
| 17.0 | 4 | 6 | -2 |
| 18.0 | 4 | 7 | -3 |
| 19.0 | 4 | 7 | -3 |
| 20.0 | 4 | 7 | -3 |
| 21.0 | 4 | 6 | -2 |
| 22.0 | 5 | 6 | -1 |
| 23.0 | 4 | 7 | -3 |
| 24.0 | 4 | 7 | -3 |
| 25.0 | 4 | 7 | -3 |
| 26.0 | 4 | 6 | -2 |
| 27.0 | 4 | 7 | -3 |
| 28.0 | 4 | 7 | -3 |
| 29.0 | 4 | 7 | -3 |
| 30.0 | 4 | 7 | -3 |
| 31.0 | 4 | 6 | -2 |

FIG. 4

| | REFERENCE PATTERN 0 | REFERENCE PATTERN 1 | REFERENCE PATTERN 2 | REFERENCE PATTERN 3 |
|---|---|---|---|---|
| n | REF[0,n] | REF[1,n] | REF[2,n] | REF[3,n] |
| 9 | | -3 | | |
| 8 | | -3 | -1 | -1 |
| 7 | | -3 | -3 | -3 |
| 6 | | -3 | -3 | -3 |
| 5 | -2 | -2 | -3 | -3 |
| 4 | -3 | -3 | -2 | -2 |
| 3 | -3 | -3 | -3 | -3 |
| 2 | -3 | -3 | -3 | -3 |
| 1 | -2 | -2 | -3 | -3 |
| 0 | 4 | 5 | -2 | -3 |

FIG. 6

CONTENTS OF ARRAYS A

| | DURING RECEPTION OF FEXT | DURING RECEPTION OF NEXT |
|---|---|---|
| A[9] | DIFFERENCE BETWEEN NUMBERS OF CONSECUTIVE FEXT FRAMES AND CONSECUTIVE NEXT FRAMES NINE LINE BEFORE | |
| A[8] | DIFFERENCE BETWEEN NUMBERS OF CONSECUTIVE FEXT FRAMES AND CONSECUTIVE NEXT FRAMES EIGHT LINES BEFORE | |
| A[7] | DIFFERENCE BETWEEN NUMBERS OF CONSECUTIVE FEXT FRAMES AND CONSECUTIVE NEXT FRAMES SEVEN LINE BEFORE | |
| A[6] | DIFFERENCE BETWEEN NUMBERS OF CONSECUTIVE FEXT FRAMES AND CONSECUTIVE NEXT FRAMES SIX LINE BEFORE | |
| A[5] | DIFFERENCE BETWEEN NUMBERS OF CONSECUTIVE FEXT FRAMES AND CONSECUTIVE NEXT FRAMES FIVE LINE BEFORE | |
| A[4] | DIFFERENCE BETWEEN NUMBERS OF CONSECUTIVE FEXT FRAMES AND CONSECUTIVE NEXT FRAMES FOUR LINE BEFORE | |
| A[3] | DIFFERENCE BETWEEN NUMBERS OF CONSECUTIVE FEXT FRAMES AND CONSECUTIVE NEXT FRAMES THREE LINE BEFORE | |
| A[2] | DIFFERENCE BETWEEN NUMBERS OF CONSECUTIVE FEXT FRAMES AND CONSECUTIVE NEXT FRAMES TWO LINE BEFORE | |
| A[1] | DIFFERENCE BETWEEN NUMBERS OF CONSECUTIVE FEXT FRAMES AND CONSECUTIVE NEXT FRAMES IN THE LINE BEFORE | |
| A[0] | NUMBER OF CONSECUTIVE FEXT FRAMES BEFORE FRAME DURING RECEPTION | DIFFERENCE BETWEEN NUMBERS OF THE NEAREST PREVIOUS CONSECUTIVE FEXT FRAMES AND CONSECUTIVE NEXT FRAMES BEFORE FRAME DURING RECEPTION |

FIG. 8

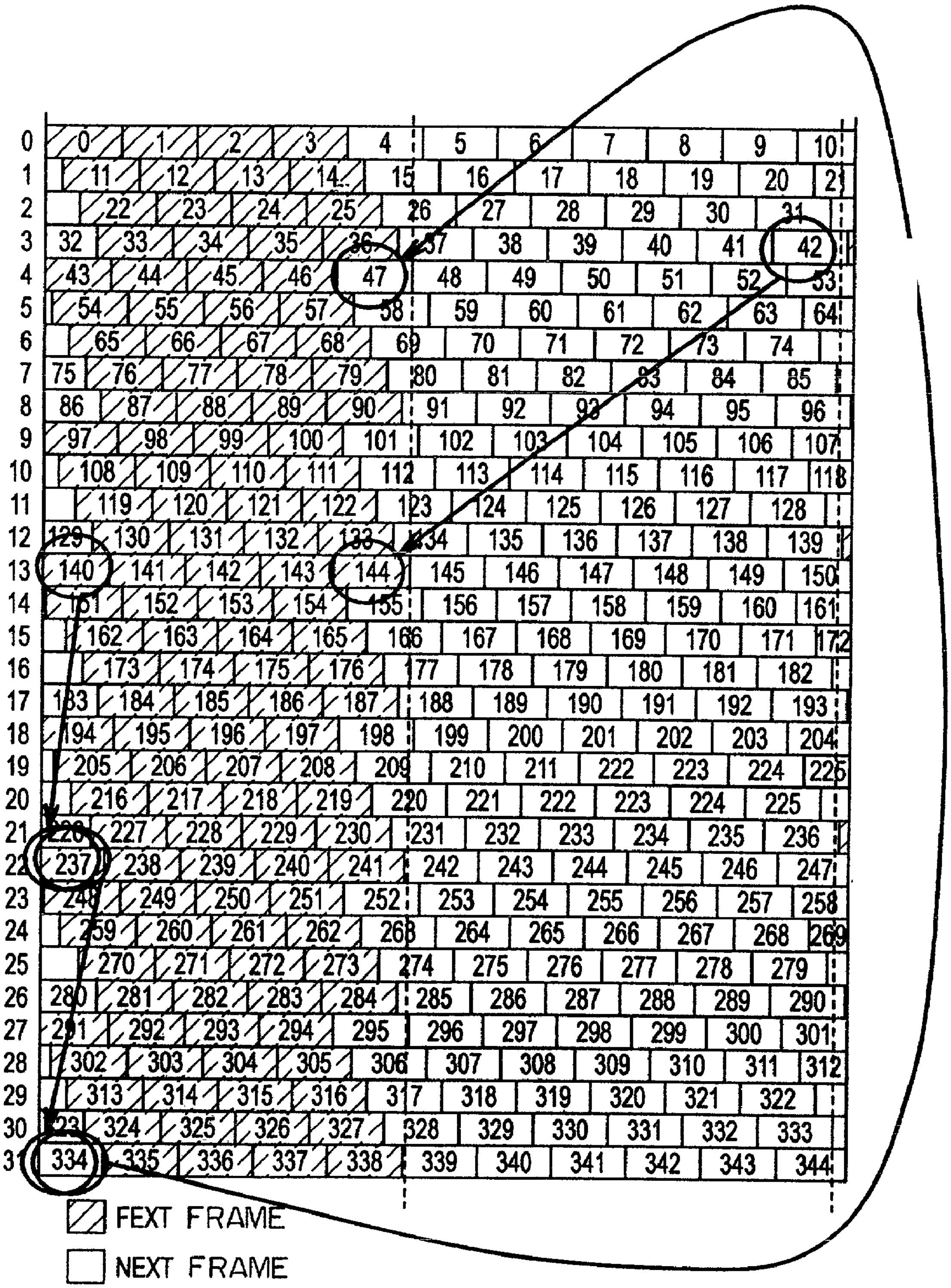
F I G. 9

| LINE | NEXT | FEXT | DIFFER-ENCE |
|---|---|---|---|
| 0.5 | 7 | 4 | 3 |
| 1.5 | 7 | 4 | 3 |
| 2.5 | 7 | 4 | 3 |
| 3.5 | 6 | 4 | 2 |
| 4.5 | 7 | 4 | 3 |
| 5.5 | 7 | 4 | 3 |
| 6.5 | 7 | 4 | 3 |
| 7.5 | 7 | 4 | 3 |
| 8.5 | 6 | 4 | 2 |
| 9.5 | 7 | 4 | 3 |
| 10.5 | 7 | 4 | 3 |
| 11.5 | 7 | 4 | 3 |
| 12.5 | 6 | 5 | 1 |
| 13.5 | 6 | 4 | 2 |
| 14.5 | 7 | 4 | 3 |
| 15.5 | 7 | 4 | 3 |
| 16.5 | 7 | 4 | 3 |
| 17.5 | 6 | 4 | 2 |
| 18.5 | 7 | 4 | 3 |
| 19.5 | 7 | 4 | 3 |
| 20.5 | 7 | 4 | 3 |
| 21.5 | 6 | 5 | 1 |
| 22.5 | 6 | 4 | 2 |
| 23.5 | 7 | 4 | 3 |
| 24.5 | 7 | 4 | 3 |
| 25.5 | 7 | 4 | 3 |
| 26.5 | 6 | 4 | 2 |
| 27.5 | 7 | 4 | 3 |
| 28.5 | 7 | 4 | 3 |
| 29.5 | 7 | 4 | 3 |
| 30.5 | 7 | 4 | 3 |
| 31.5 | 6 | 4 | 2 |

FIG. 10

REFERENCE PATTERN 0' REFERENCE PATTERN 1' REFERENCE PATTERN 2' REFERENCE PATTERN 3'

| n | REF[0',n] | REF[1',n] | REF[2',n] | REF[3',n] |
|---|---|---|---|---|
| 9 | | | | 1 |
| 8 | | 3 | 2 | 2 |
| 7 | | 3 | 3 | 3 |
| 6 | | 3 | 3 | 3 |
| 5 | 3 | 3 | 3 | 3 |
| 4 | 2 | 2 | 2 | 2 |
| 3 | 3 | 3 | 3 | 3 |
| 2 | 3 | 3 | 3 | 3 |
| 1 | 3 | 3 | 3 | 3 |
| 0 | 2 | 1 | 6 | 7 |

FIG. 12

CONTENTS OF ARRAYS B

| | DURING RECEPTION OF FEXT | DURING RECEPTION OF NEXT |
|---|---|---|
| B[9] | DIFFERENCE BETWEEN NUMBERS OF CONSECUTIVE NEXT FRAMES AND CONSECUTIVE FEXT FRAMES NINE LINE BEFORE | |
| B[8] | DIFFERENCE BETWEEN NUMBERS OF CONSECUTIVE NEXT FRAMES AND CONSECUTIVE FEXT FRAMES EIGHT LINE BEFORE | |
| B[7] | DIFFERENCE BETWEEN NUMBERS OF CONSECUTIVE NEXT FRAMES AND CONSECUTIVE FEXT FRAMES SEVEN LINE BEFORE | |
| B[6] | DIFFERENCE BETWEEN NUMBERS OF CONSECUTIVE NEXT FRAMES AND CONSECUTIVE FEXT FRAMES SIX LINE BEFORE | |
| B[5] | DIFFERENCE BETWEEN NUMBERS OF CONSECUTIVE NEXT FRAMES AND CONSECUTIVE FEXT FRAMES FIVE LINE BEFORE | |
| B[4] | DIFFERENCE BETWEEN NUMBERS OF CONSECUTIVE NEXT FRAMES AND CONSECUTIVE FEXT FRAMES FOUR LINE BEFORE | |
| B[3] | DIFFERENCE BETWEEN NUMBERS OF CONSECUTIVE NEXT FRAMES AND CONSECUTIVE FEXT FRAMES THREE LINE BEFORE | |
| B[2] | DIFFERENCE BETWEEN NUMBERS OF CONSECUTIVE NEXT FRAMES AND CONSECUTIVE FEXT FRAMES TWO LINE BEFORE | |
| B[1] | DIFFERENCE BETWEEN NUMBERS OF CONSECUTIVE NEXT FRAMES AND CONSECUTIVE FEXT FRAMES IN THE LINE BEFORE | |
| B[0] | NUMBER OF CONSECUTIVE NEXT FRAMES BEFORE FRAME DURING RECEPTION | DIFFERENCE BETWEEN NUMBERS OF THE NEAREST PREVIOUS CONSECUTIVE NEXT FRAMES AND CONSECUTIVE FEXT FRAMES BEFORE FRAME DURING RECEPTION |

FIG. 14

WHEN FEXT-NEXT DIFFERENCE IS USED

| REFERENCE PATTERN | FRAME SYNCHRONIZATION | HYPERFRAME SYNCHRONIZATION |
|---|---|---|
| 0 | 238～334 | 47 |
| 1 | 335～344,0～42 | 144 |
| 2 | 43～140 | 237 |
| 3 | 141～237 | 334 |

FIG. 16

WHEN NEXT-FEXT DIFFERENCE IS USED

| REFERENCE PATTERN | FRAME SYNCHRONIZATION | HYPERFRAME SYNCHRONIZATION |
|---|---|---|
| 0' | 231～328 | 47 |
| 1' | 329～344,0～47 | 144 |
| 2' | 48～144 | 237 |
| 3' | 145～230 | 334 |

FIG. 17

WHEN FEXT-NEXT DIFFERENCE AND NEXT-FEXT DIFFERENCE ARE COMBINED

| REFERENCE PATTERN | FRAME SYNCHRONIZATION | HYPERFRAME SYNCHRONIZATION |
|---|---|---|
| 0 | 238～334 | 47 |
| 1' | 335～344,0～47 | 144 |
| 2' | 48～144 | 237 |
| 3 | 145～237 | 334 |

FIG. 18

REFERENCE PATTERN 0
REFERENCE PATTERN 1'
REFERENCE PATTERN 2'
REFERENCE PATTERN 3'

| n | REF[0,n] | REF[1',n] | REF[2',n] | REF[3,n] |
|---|---|---|---|---|
| 8 | | 3 | 2 | 1 |
| 7 | | 3 | 3 | 3 |
| 6 | | 3 | 3 | 3 |
| 5 | 2 | 3 | 3 | 3 |
| 4 | 3 | 2 | 2 | 2 |
| 3 | 3 | 3 | 3 | 3 |
| 2 | 3 | 3 | 3 | 3 |
| 1 | 2 | 3 | 3 | 3 |
| 0 | 4 | 1 | 6 | 3 |

FIG. 20

CONTENTS OF ARRAYS A

| | DURING RECEPTION OF FEXT | DURING RECEPTION OF NEXT |
|---|---|---|
| A[8] | DIFFERENCE BETWEEN NUMBERS OF CONSECUTIVE FEXT FRAMES AND CONSECUTIVE NEXT FRAMES EIGHT LINE BEFORE | |
| A[7] | DIFFERENCE BETWEEN NUMBERS OF CONSECUTIVE FEXT FRAMES AND CONSECUTIVE NEXT FRAMES SEVEN LINE BEFORE | |
| A[6] | DIFFERENCE BETWEEN NUMBERS OF CONSECUTIVE FEXT FRAMES AND CONSECUTIVE NEXT FRAMES SIX LINE BEFORE | |
| A[5] | DIFFERENCE BETWEEN NUMBERS OF CONSECUTIVE FEXT FRAMES AND CONSECUTIVE NEXT FRAMES FIVE LINE BEFORE | |
| A[4] | DIFFERENCE BETWEEN NUMBERS OF CONSECUTIVE FEXT FRAMES AND CONSECUTIVE NEXT FRAMES FOUR LINE BEFORE | |
| A[3] | DIFFERENCE BETWEEN NUMBERS OF CONSECUTIVE FEXT FRAMES AND CONSECUTIVE NEXT FRAMES THREE LINE BEFORE | |
| A[2] | DIFFERENCE BETWEEN NUMBERS OF CONSECUTIVE FEXT FRAMES AND CONSECUTIVE NEXT FRAMES TWO LINE BEFORE | |
| A[1] | DIFFERENCE BETWEEN NUMBERS OF CONSECUTIVE FEXT FRAMES AND CONSECUTIVE NEXT FRAMES IN THE LINE BEFORE | |
| A[0] | NUMBER OF CONSECUTIVE FEXT FRAMES BEFORE FRAME DURING RECEPTION | DIFFERENCE BETWEEN NUMBERS OF THE NEAREST PREVIOUS CONSECUTIVE FEXT FRAMES AND CONSECUTIVE NEXT FRAMES BEFORE FRAME DURING RECEPTION |

FIG. 22

CONTENTS OF ARRAYS B

| | DURING RECEPTION OF FEXT | DURING RECEPTION OF NEXT |
|---|---|---|
| B[8] | DIFFERENCE BETWEEN NUMBERS OF CONSECUTIVE NEXT FRAMES AND CONSECUTIVE FEXT FRAMES EIGHT LINE BEFORE | |
| B[7] | DIFFERENCE BETWEEN NUMBERS OF CONSECUTIVE NEXT FRAMES AND CONSECUTIVE FEXT FRAMES SEVEN LINE BEFORE | |
| B[6] | DIFFERENCE BETWEEN NUMBERS OF CONSECUTIVE NEXT FRAMES AND CONSECUTIVE FEXT FRAMES SIX LINE BEFORE | |
| B[5] | DIFFERENCE BETWEEN NUMBERS OF CONSECUTIVE NEXT FRAMES AND CONSECUTIVE FEXT FRAMES FIVE LINE BEFORE | |
| B[4] | DIFFERENCE BETWEEN NUMBERS OF CONSECUTIVE NEXT FRAMES AND CONSECUTIVE FEXT FRAMES FOUR LINE BEFORE | |
| B[3] | DIFFERENCE BETWEEN NUMBERS OF CONSECUTIVE NEXT FRAMES AND CONSECUTIVE FEXT FRAMES THREE LINE BEFORE | |
| B[2] | DIFFERENCE BETWEEN NUMBERS OF CONSECUTIVE NEXT FRAMES AND CONSECUTIVE FEXT FRAMES TWO LINE BEFORE | |
| B[1] | DIFFERENCE BETWEEN NUMBERS OF CONSECUTIVE NEXT FRAMES AND CONSECUTIVE FEXT FRAMES IN THE LINE BEFORE | |
| B[0] | NUMBER OF CONSECUTIVE NEXT FRAMES BEFORE FRAME DURING RECEPTION | DIFFERENCE BETWEEN NUMBERS OF THE NEAREST PREVIOUS CONSECUTIVE NEXT FRAMES AND CONSECUTIVE FEXT FRAMES BEFORE FRAME DURING RECEPTION |

FIG. 23

HYPERFRAME SYNCHRONIZATION PROCESSING APPARATUS AND HYPERFRAME SYNCHRONIZATION METHOD

CROSS REFERENCE TO RELATED APPLICATION

This application claims benefit of priority under 35 U.S.C. §119 to Japanese Patent Application No. 2000-130548, filed on Apr. 28, 2000, the entire contents of which are incorporated by reference herein.

BACKGROUND OF THE INVENTION

1. Field of the Invention

The present invention relates to a hyperframe synchronization processing apparatus and a hyperframe synchronization method, and particularly relates to a hyperframe synchronization processing apparatus and a hyperframe synchronization method capable of establishing a hyperframe synchronization in a short time after establishing a frame synchronization.

2. Related Background Art

There is a communication method in which a certain fixed period of time is set as a minimum unit (a frame) of transmission of data and meaningful data are composed by a combination of a plurality of minimum units (a hyperframe). An example of such a communication method is the ADSL (Asymmetric Digital Subscriber Line) Modem Standard (G.992. 1, G.992. 2) recommended by the ITU-T.

In such a communication method, in initialization processing before starting data exchange, frame synchronization processing of establishing frame synchronization between a transmitter and a receiver is performed, and thereafter hyperframe synchronization processing of establishing hyperframe synchronization is performed. The establishment of hyperframe synchronization means that the receiver recognizes the position of a frame during reception in a hyperframe. This hyperframe synchronization is performed after the establishment of frame synchronization.

In a specification for Japan (Annex C) which is one of annexes of the aforesaid ADSL Modem Standard, a subscriber who is a receiver is obligated to perform hyperframe synchronization for a station which is a transmitter.

FIG. 27 is a diagram showing the configuration of a hyperframe of a down stream in this ADSL Modem Standard. Incidentally, the down stream means the flow of data from the station to the subscriber. The opposite direction is called an up stream. In the ITU-T Standard, hyperframe synchronization is prescribed only in the down stream.

As shown in FIG. 27. the length of one frame is 250×(68/69) μ seconds, that is, about 246μ seconds. Numbers assigned to respective frames show frame numbers in a hyperframe, and the respective frames are transmitted in order of these frame numbers. One hyperframe is composed of 345 consecutive frames, and its length is 250×(68/69)×345μ seconds, that is 85 m seconds.

In FIG. 27, a hatched frame is called an FEXT frame (far end cross talk frame), and a white frame is called a NEXT frame (near end cross talk frame). In the hyperframe, there are no other types than these. In the stage of initialization of the down stream, included in each frame is only information on distinction between an FEXT frame and a NEXT frame.

The reason why frames are divided into FEXT frames and NEXT frames as described above is that a crosstalk between this ADSL and the ISDN is taken into consideration.

Namely, in view of noises in ISDN, frames can be divided into FEXT frames capable of transmitting many data and NEXT frames incapable of transmitting many data. Synchronization can be established only at every 345th frame between the ADSL and the ISDN. Hence, one hyperframe is composed of 345 frames.

Each frame of this hyperframe is composed of sin waves of 207 kHz and 276 kHz, and distinction between an FEXT frame and a NEXT frame is made by a phase of a sin wave of 207 kHz out of these sin waves. Therefore, when the receiver performs hyperframe synchronization, the receiver needs to judge where a frame during reception is in the hyperframe from the order of sequences of transmitted FEXT frames and NEXT frames.

SUMMARY OF THE INVENTION

The present invention is made in view of the aforesaid problems, and an object of the present invention is to provide a method for performing hyperframe synchronization at a high speed after the establishment of frame synchronization on the subscriber side, that is, to provide a method for quickly recognizing where a frame is in a hyperframe only from information on distinction between an FEXT frame and a NEXT frame which is included in each frame.

In order to accomplish the aforementioned and other objects, according to one aspect of the present invention, a hyperframe synchronization processing apparatus for establishing synchronization of a hyperframe which has a plurality of first frame groups each including one or a plurality of first frames and a plurality of second frame groups each including one or a plurality of second frames distinguishable from the first frames and in which the first frame groups and the second frame groups appear alternately, the hyperframe synchronization processing apparatus comprising:

a difference calculator configured to calculate differences between the number of the first frames included in the respective first frame groups and the number of the second frames included in the respective second frame groups which follow these respective first frame groups in the received hyperframe;

a storage configured to sequentially store the differences calculated by the difference calculator; and a synchronizer configured to establish the synchronization of the hyperframe by using the differences stored in the storage.

According to another aspect of the present invention, hyperframe synchronization processing apparatus for establishing synchronization of a hyperframe which has a plurality of first frame groups each including one or a plurality of first frames and a plurality of second frame groups each including one or a plurality of second frames distinguishable from the first frames and in which the first frame groups and the second frame groups appear alternately, the hyperframe synchronization processing apparatus comprising:

a first difference calculator configured to calculate differences between the number of the first frames included in the respective first frame groups and the number of the second frames included in the respective second frame groups which follow these respective first frame groups in the received hyperframe;

a first storage configured to sequentially store the differences calculated by the first difference calculator;

a second difference calculator configured to calculate differences between the number of the second frames included in the respective second frame groups and the number of the first frames included in the respective first frame groups which follow these respective second frame groups in the received hyperframe;

a second storage configured to sequentially store the differences calculated by the second difference calculator;

a synchronizer configured to establish the synchronization of the hyperframe by using the differences stored in the first storage and the second storage.

According to a further aspect of the present invention, hyperframe synchronization method for establishing synchronization of a hyperframe which has a plurality of first frame groups each including one or a plurality of first frames and a plurality of second frame groups each including one or a plurality of second frames distinguishable from the first frames and in which the first frame groups and the second frame groups appear alternately, the hyperframe synchronization method comprising:

a difference calculating step of calculating differences between the number of the first frames included in the respective first frame groups and the number of the second frames included in the respective second frame groups which follow these respective first frame groups in the received hyperframe;

a storing step of sequentially storing the differences calculated in the difference calculating step; and a synchronizing step of establishing the synchronization of the hyperframe by using the differences stored in the storing step.

According to a still further aspect of the present invention, a hyperframe synchronization method for establishing synchronization of a hyperframe which has a plurality of first frame groups each including one or a plurality of first frames and a plurality of second frame groups each including one or a plurality of second frames distinguishable from the first frames and in which the first frame groups and the second frame groups appear alternately, the hyperframe synchronization method comprising:

a first difference calculating step of calculating differences between the number of the first frames included in the respective first frame groups and the number of the second frames included in the respective second frame groups which follow these respective first frame groups in the received hyperframe;

a first storing step of sequentially storing the differences calculated in the first difference calculating step;

a second difference calculating step of calculating differences between the number of the second frames included in the respective second frame groups and the number of the first frames included in the respective first frame groups which follow these respective second frame groups in the received hyperframe;

a second storing step of sequentially storing the differences calculated in the second difference calculating step;

a synchronizing step of establishing the synchronization of the hyperframe by using the differences stored in the first storing step and the second storing step.

BRIEF DESCRIPTION OF THE DRAWINGS

FIG. 1 is a diagram showing the number of consecutive FEXT frames and the number of consecutive NEXT frames subsequent to the consecutive FEXT frames in each line used in a first embodiment of the present invention in the table;

FIG. 4 is a diagram showing the number of consecutive FEXT frames, the number of consecutive NEXT frames subsequent to the consecutive FEXT frames, and a difference between these numbers in each line used in a second embodiment of the present invention in the table;

FIG. 6 is a diagram showing the four unique sequences of FEXT-NEXT differences shown in FIG. 5 in the form of arrays;

FIG. 8 is a diagram explaining arrays used in the hyperframe synchronization processing according to the second embodiment of the present invention;

FIG. 9 is a diagram showing the configuration of a hyperframe used when the performance of the second embodiment of the present invention is considered;

FIG. 10 is a diagram showing the number of consecutive NEXT frames, the number of consecutive FEXT frames subsequent to the consecutive NEXT frames, and a difference between these numbers in each line used in a third embodiment of the present invention in the table;

FIG. 12 is a diagram showing the four unique sequences of NEXT-FEXT differences shown in FIG. 11 in the form of arrays;

FIG. 14 is a diagram explaining arrays used in the hyperframe synchronization processing according to the third embodiment of the present invention;

FIG. 16 is a diagram showing the timing of frame synchronization and the timing of hyperframe synchronization in the second embodiment of the present invention in the table;

FIG. 17 is a diagram showing the timing of frame synchronization and the timing of hyperframe synchronization in the third embodiment of the present invention in the table;

FIG. 18 is a diagram showing the timing of frame synchronization and the timing of hyperframe synchronization in the table when the timings of frame synchronization and the timings of hyperframe synchronization shown in FIG. 16 and FIG. 17 are optimally combined;

FIG. 20 is a diagram showing the four unique sequences of FEXT-NEXT differences and NEXT-FEXT differences shown in FIG. 19 in the form of arrays;

FIG. 22 is a diagram explaining arrays (arrays "A") used in the hyperframe synchronization processing according to the fourth embodiment of the present invention;

FIG. 23 is a diagram explaining arrays (arrays "B") used in the hyperframe synchronization processing according to the fourth embodiment of the present invention;

DESCRIPTION OF THE PREFERRED EMBODIMENTS

[First Embodiment]

The first embodiment of the present invention is designed to detect the position of a frame in a hyperframe by using the fact that five consecutive FEXT frames exist only at two positions in a sequence of 345 frames in the hyperframe. This will be explained below in detail.

In this embodiment, a communication method such as G.992. 1/G.992. 2 Annex C in which one hyperframe is composed of a plurality of frames is a premise.

Figure 27:
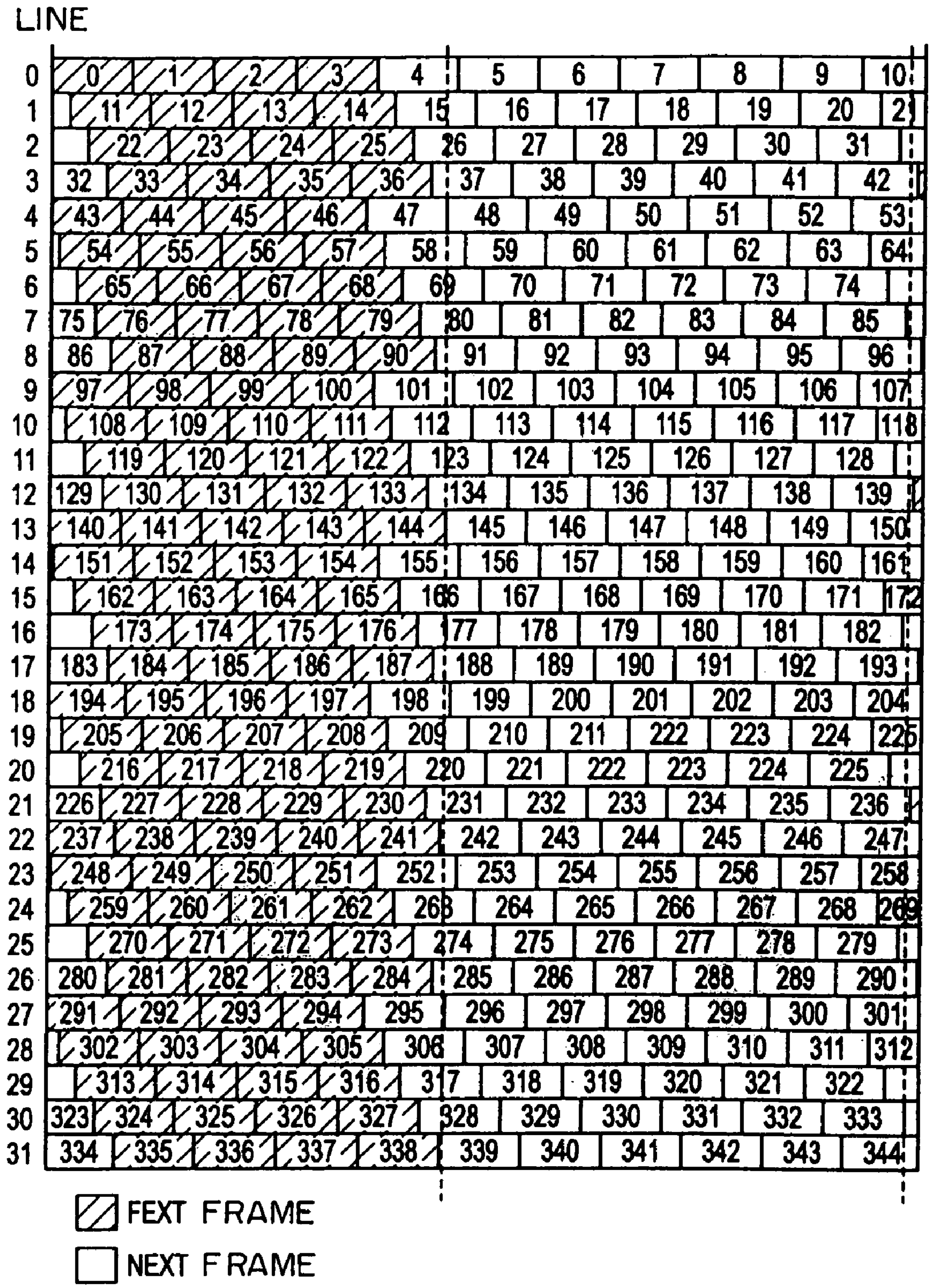
FIG. 27 is a diagram showing the configuration of a hyperframe in the ADSL Modem Standard (Annex C of the ITU-T Recommendations G.992. 1 and G.992. 2).

FIG. 1 is a diagram showing the numbers of FEXT frames and NEXT frames in each line in a hyperframe shown in FIG. 27 in the table. Any line in the table in FIG. 1 is set with a group of consecutive FEXT frames and a group of consecutive NEXT frames subsequent to the consecutive FEXT frames in FIG. 27 as one unit. A FEXT column shows the numbers of consecutive FEXT frames in respective lines, while a NEXT column shows the numbers of consecutive NEXT frames in the respective lines.

The table in FIG. 1 is characterized by the existence of the numeral "5" only at two positions in the FEXT column. Namely, five consecutive FEXT frames exist in the 13th line and the 22nd line, which correspond to frame numbers 140 to 144 and frame numbers 237 to 241 in the hyperframe in FIG. 27. Hence, in this embodiment, the position of a frame during reception in the hyperframe is pinpointed with the existence of these five consecutive FEXT frames only at two positions as a clue.

Figure 2:
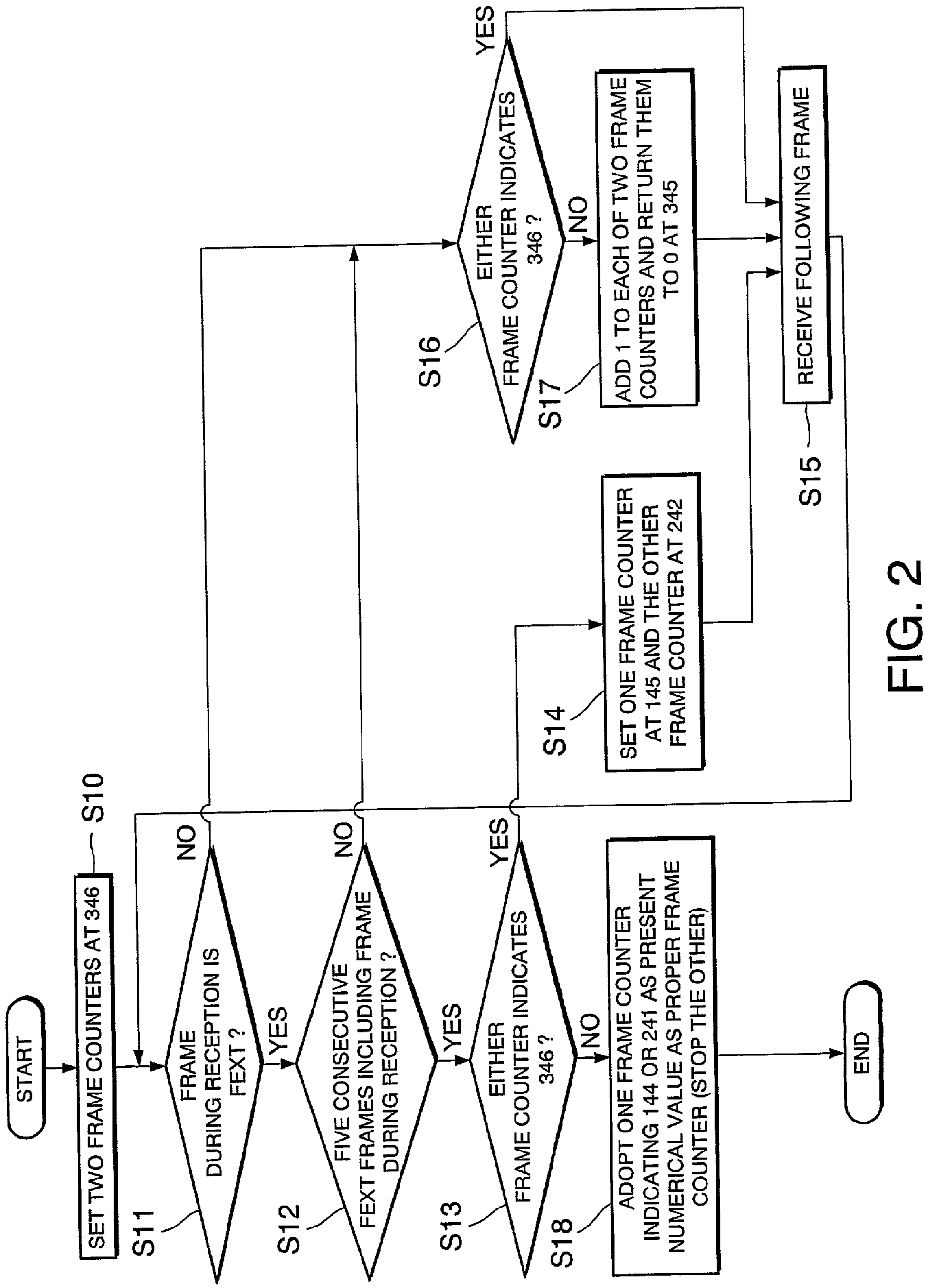
FIG. 2 is a flowchart explaining hyperframe synchronization processing in the first embodiment of the present invention.

Next, hyperframe synchronization processing according to this embodiment will be explained based on a flowchart shown in FIG. 2. The hyperframe synchronization processing shown in FIG. 2 is started when frame synchronization is established.

The processing in this flowchart is summarized as follows. Specifically, when the first five consecutive FEXT frames are detected, one frame counter is set at 145, and the other frame counter is set at 242. Every time a frame is received, numbers in these two frame counters are counted up, and it is known that either one of the frame counters which indicates 144 or 241 is a correct frame counter when the second five consecutive FEXT frames are received. Incidentally, the number indicated by each of the two frame counters is returned to 0 when the frame counter indicates 345.

In a more detailed explanation, first, two frame counters are prepared, and the two frame counters are set at 346 (step S10), where setting at 346 shows that the count of frames has not been started yet.

Thereafter, it is determined whether a frame during reception is a FEXT frame or not (step S11). When the frame during reception is a FEXT frame (step S11: Yes), it is determined whether five consecutive FEXT frames including the FEXT frame during reception are received or not (step S12).

When the five consecutive FEXT frames are received (step S12: Yes), it is determined whether either of the frame counters indicates 346 or not (step S13). When either of the frame counters indicates 346 (step S13: Yes), one frame counter is set at 145, while the other frame counter is set at 242 (step S14). Thereby, the count of frames is started. The next frame is then received (step S15), and the procedure is returned to processing in the aforesaid step S11.

When the frame during reception is not a FEXT frame in the aforesaid step S11 (step S11: No) or when five consecutive FEXT frames including the FEXT frame during reception are not received (step S12: No), it is determined whether either of the frame counters indicates 346 or not (step S16). When either of the frame counters indicates 346 (step S16: Yes), the next frame is received (step S15) since the count has not been started yet, and the procedure is returned to processing in the aforesaid step S11.

Meanwhile, when either of the frame counters does not indicate 346, it means that the count of frames is already started, and hence one is added to each of the two frame counters (step S17). When the frame counter indicates 346, however, the counter returns to 0. The next frame is then received (step S15), and the procedure is returned to processing in the aforesaid step S11.

When neither of the frame counters indicates 346 in the aforesaid step S13 (step S13: No), it means that the second five consecutive FEXT frames are detected, and hence one frame counter indicating 144 or 241 as a present numerical value is adopted as a proper frame counter (step S18). The other frame counter is stopped, and then this hyperframe synchronization processing is completed.

In the hyperframe with a configuration shown in FIG. 27, there is no possibility that two frame counters indicate 144 and 241 simultaneously.

Figure 3:
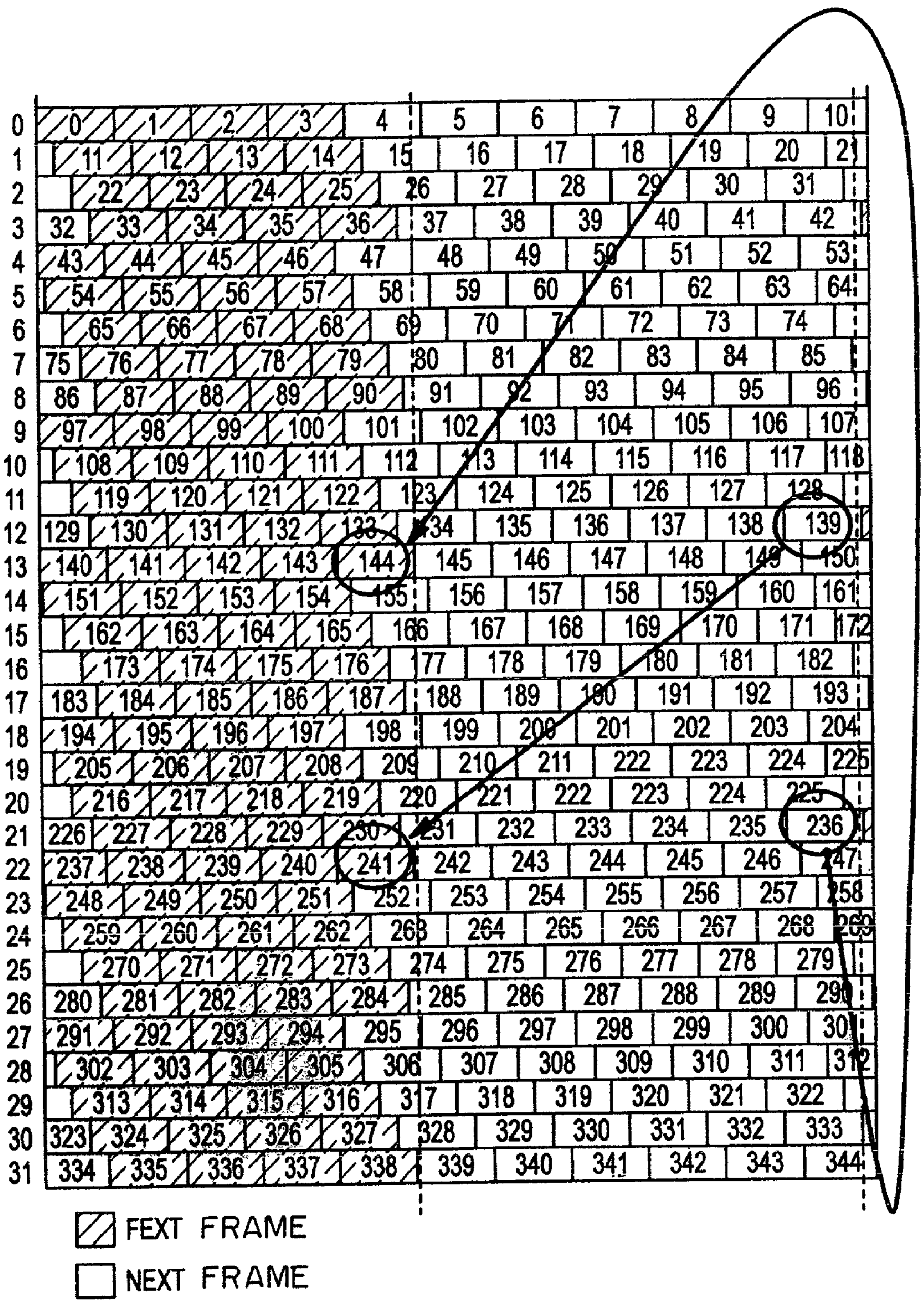
FIG. 3 is a diagram showing the configuration of a hyperframe used when the performance of the first embodiment of the present invention is considered.

Next, the performance of the hyperframe synchronization processing according to this embodiment will be explained based on FIG. 3. FIG. 3 is a diagram for explaining which frame number hyperframe synchronization can be secured at, provided that frame synchronization can be established at or before a certain frame number and then hyperframe synchronization can be started in the hyperframe shown in FIG. 27.

As shown in FIG. 3, in order to first recognize five consecutive FEXT frames of frame numbers 140 to 144, frame synchronization needs to be established at or before frame number 139. When the frame synchronization is established at or before frame number 139, hyperframe synchronization can be established when the next five consecutive FEXT frames are recognized, that is, at frame number 241.

Meanwhile, in order to first recognize five consecutive FEXT frames of frame numbers 237 to 241, frame synchronization needs to be established at or before frame number 236. When the frame synchronization is established at or before frame number 236, hyperframe synchronization can be established when the next five consecutive FEXT frames are recognized, that is, at frame number 144 of the next hyperframe.

Accordingly, the establishment of hyperframe synchronization is classified into the following three patterns.

(1) When frame synchronization is established between frame numbers 0 and 139, hyperframe synchronization can be established at frame number 241.

(2) When frame synchronization is established between frame numbers 140 and 236, hyperframe synchronization can be established at frame number 144 of the next hyperframe.

(3) When frame synchronization is established between frame numbers 237 and 344, hyperframe synchronization can be established at frame number 241 of the next hyperframe.

In such cases, if the average period of time from the establishment of frame synchronization to the establishment of hyperframe synchronization is calculated with the length of a frame as a unit, the following answer is derived.

$$\frac{\sum_{i=0}^{139}(241-i)+\sum_{i=140}^{236}(345+144-i)+\sum_{i=237}^{344}(345+241-i)}{345}\approx 246.73 \quad \text{(Equation 1)}$$

Namely, a period of time corresponding to about 246.7 frames on average is necessary before hyperframe synchronization is secured after the secureness of frame synchronization. Moreover, it takes a longest period of time when frame synchronization is established at frame number 140 or frame number 237, in which case a period of time corresponding to 349 frames is needed.

As described above, according to this embodiment, hyperframe synchronization can be performed after frame synchronization is established.

[Second Embodiment]

In the aforesaid first embodiment, there are only two positions for accomplishing hyperframe synchronization, and therefore, it sometimes takes a long time before hyperframe synchronization is accomplished after the accomplishment of frame synchronization. In the second embodiment of the present invention, the number of frame positions where hyperframe synchronization can be accomplished by using differences between the numbers of consecutive FEXT frames and NEXT frames is increased to four, whereby the period of time required from the accomplishment of frame synchronization to the accomplishment of hyperframe synchronization is shortened. A more detailed explanation will be given below.

FIG. 4 is a diagram showing the number of consecutive FEXT frames, the number of consecutive NEXT frames subsequent to the consecutive FEXT frames, and a difference between the numbers of consecutive FEXT frames and consecutive NEXT frames in each line in the hyperframe configuration shown in FIG. 27 in the table.

When an explanation is given with the 0 line as an example, as shown in FIG. 27, four FEXT frames continue from frame number to frame number 3, and seven NEXT frames continue from frame number 4 to frame number 10. Accordingly, a difference between the numbers of consecutive FEXT frames and consecutive NEXT frames is −3. This difference is referred to as a FEXT-NEXT difference hereinafter.

Figure 5:
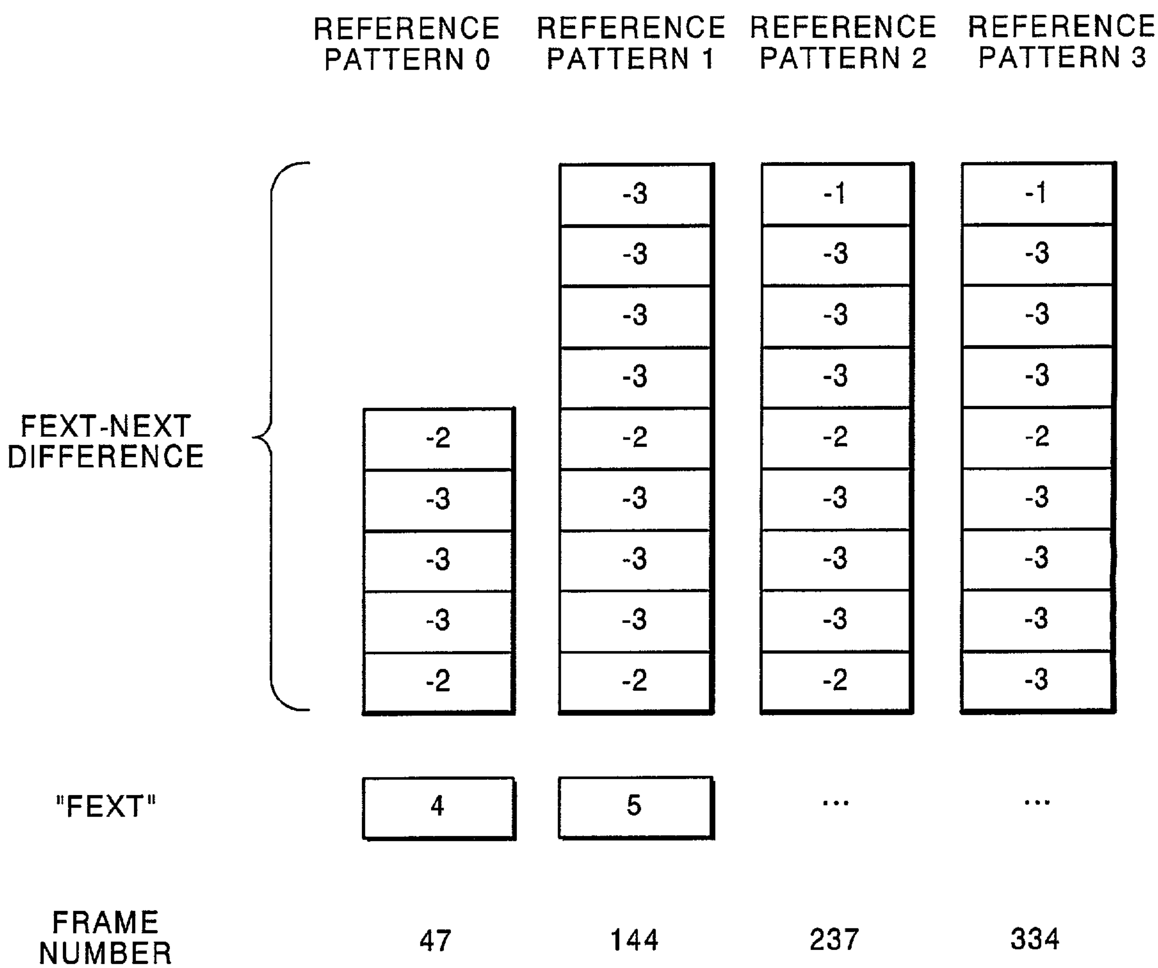
FIG. 5 is a diagram showing four unique sequences of FEXT-NEXT differences used in the second embodiment of the present invention.

When a sequence of FEXT-NEXT differences and the number of consecutive FEXT frames subsequent to the sequence are combined, four patterns of unique combination can be found. FIG. 5 is a diagram showing these four patterns of unique combination.

As shown in FIG. 5, a pattern in which after a sequence of FEXT-NEXT differences of −2, −3, −3, −3, and −2, four FEXT frames continue, for example, as in a reference pattern 0 applies to only frame number 47 in this hyperframe. For this reason, when this reference pattern 0 is detected, it can be determined that the frame during reception is frame number 47.

Incidentally, in this reference pattern 0, the reference pattern 0 can not be confirmed definitely until the NEXT frame of frame number 47 is received. This is because the continuation of four FEXT frames can be confirmed definitely when the NEXT frame of frame number 47 is received, since there is a possibility that five consecutive FEXT frames are transmitted in the same pattern.

Further, a pattern in which after a continuation of FEXT-NEXT differences of −3, −3, −3, −3, −2, −3, −3, −3, and −2, five FEXT frames continue, for example, as in a reference pattern 1 applies to only frame number 144 in this hyperframe. For this reason, when this reference pattern 1 is detected, it can be determined that the frame during reception is frame number 144.

Incidentally, in this reference pattern 1, the reference pattern 1 can be confirmed definitely when the FEXT frame of frame number 144 is received. This is because the continuation of five FEXT frames can be confirmed definitely when the FEXT frame of frame number 144 is received, since there is no possibility that more than five consecutive FEXT frames are transmitted.

Similarly, when a receiver receives a reference pattern 2, it can be determined that the frame number of the frame during reception is 237. When the receiver receives a reference pattern 3, it can be determined that the frame number of the frame during reception is 334. In these reference patterns 2 and 3, the frame number of a frame during reception can be specified only FEXT-NEXT differences without counting the number of consecutive FEXT frames.

FIG. 6 is a diagram showing the reference pattern 0 to the reference pattern 3 shown in FIG. 5 in the form of arrays. Namely, the reference pattern 0 to the reference pattern 3 are stored respectively in arrays REF[0, 0] to REF[0, 5], arrays REF[1, 0] to REF[1, 9], arrays REF[2, 0] to REF[2, 8], and arrays REF[3, 0] to REF[3, 8].

Figure 7:
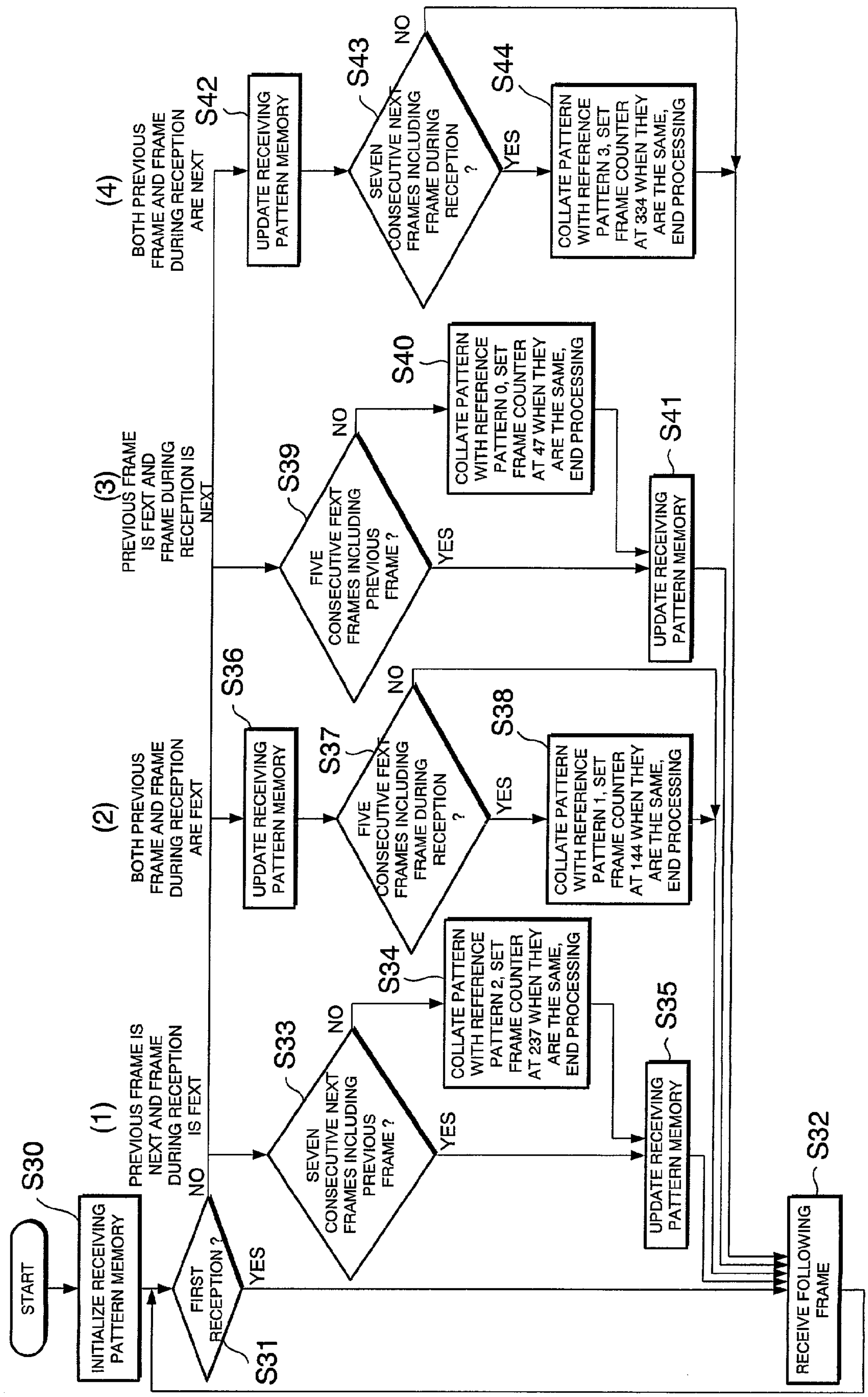
FIG. 7 is a flowchart explaining hyperframe synchronization processing in the second embodiment of the present invention.

Next, hyperframe synchronization processing according to this embodiment will be explained based on a flowchart shown in FIG. 7. This hyperframe synchronization processing shown in FIG. 7 is started when frame synchronization is established.

The processing in this flowchart is summarized as follows. Namely, received frames are counted sequentially while it is confirmed whether each of them is a FEXT frame or a NEXT frame, and FEXT-NEXT differences are stored sequentially. It is judged whether or not a pattern which corresponds to any of the aforesaid reference patterns 0 to 3 appears. When any of these reference patterns 0 to 3 is detected, the frame number during reception is specified.

In a more detailed explanation, when this hyperframe synchronization processing is started, a receiving pattern memory is initialized (step S30). In this embodiment, arrays A[0] to A[9]are stored in the receiving pattern memory. FIG. 8 is a table explaining the contents of the arrays A[0] to A[9].

As shown in FIG. 8, in the array A[0], during reception of a FEXT frame, the number of consecutive FEXT frames before the frame during reception is stored, whereas during reception of a NEXT frame, a difference between the number of the consecutive FEXT frames and the number of consecutive NEXT frames before the frame during reception is stored.

The arrays A[1] to A[9] store differences between the number of consecutive FEXT frames and the number of consecutive NEXT frames in the line from the first line before to the ninth line before, respectively. Namely, in the arrays A[1] to A[9], FEXT-NEXT differences up to the ninth line before are stored. The reason why ten arrays A[0] to A[9] are prepared is that nine arrays A[1] to A[9] are required to store FEXT-NEXT differences in the reference pattern 1 shown in FIG. 5, and in addition that one array A[0] is required to count the number of frames which are now being received.

As shown in FIG. 7, subsequently, it is determined whether the first frame is received in the hyperframe synchronization processing (step S31). When it is the first frame (step S31: Yes), the next frame is received (step S32), and the procedure is returned to processing in step S31.

When it is not the first frame(step S31: No), there are the following cases: (1) the previous frame is a NEXT frame, and the frame during reception is a FEXT frame; (2) the previous frame is a FEXT frame, and the frame during reception is also a FEXT frame; (3) the previous frame is a FEXT frame, and the frame during reception is a NEXT frame; and (4) the previous frame is a NEXT frame and the frame during reception is also a NEXT frame.

(1) When the previous frame is a NEXT frame, and the frame during reception is a FEXT frame, it is determined whether there exist seven consecutive NEXT frames including the previous frame (step S33). When seven consecutive NEXT frames do not exist (step S33: No), that is, when there exist six consecutive NEXT frames, a pattern up to that time is collated with the reference pattern 2. When they are the same, the frame counter is set at 237, and this processing is completed (step S34). Namely, the arrays A[0] to A[8] in the receiving pattern memory and the arrays REF[2, 0] to REF[2, 8] in the reference pattern 2 are compared, and it is determined whether they are the same. When they are the same, it can be determined that the frame during reception is frame number 237.

When they are not the same or when there exist seven consecutive NEXT frames including the previous frame in the aforesaid step S33 (step S 33: Yes), the receiving pattern memory is updated (step S35). Namely, the arrays A[0] to A[8] shown in FIG. 8 are shifted one by one, resulting in the arrays A[1] to A[9]. The next frame is then received (step S32), and the procedure is returned to the processing in the aforesaid step S31.

(2) When the previous frame is a FEXT frame, and the frame during reception is also a FEXT frame, the receiving pattern memory is updated (step S36). Namely, the array A[0] shown in FIG. 8 is updated. In this case, the array A[0] is counted up by one since the FEXT frame is being received.

Then, it is determined whether five consecutive FEXT frames including the frame during reception are received (step S37). when five consecutive FEXT frames are received (step S37: Yes), a pattern up to that time is collated with the reference pattern 1. When they are the same, the frame counter is set at 144, and this processing is completed (step S38). Namely, the arrays A[0] to A[9] in the receiving pattern memory and the arrays REF[1, 0] to REF[1, 9] in the reference pattern 1 are compared, and it is determined whether they are the same. When they are the same, it can be determined that the frame during reception is frame number 144.

When they are not the same or when five consecutive FEXT frames including the frame during reception are not received in the aforesaid step S37 (step S37: No), the next frame is received (step S32), and the procedure is returned to the processing in the aforesaid step S31.

(3) When the previous frame is a FEXT frame, and the frame during reception is a NEXT frame, it is determined whether there exist five consecutive FEXT frames including the previous frame (step S39). When five consecutive FEXT frames do not exist (step S39: No), that is, when there exist four consecutive FEXT frames, a pattern up to that time is collated with the reference pattern 0. When they are the same, the frame counter is set at 47, and this processing is completed. Namely, the arrays A[0] to A[5] in the receiving pattern memory and the arrays REF[0, 0] to REF[0, 5] in the reference pattern 0 are compared, and it is determined whether they are the same (step S40). When they are the same, it can be determined that the frame during reception is frame number 47.

When they are not the same or when there exist five consecutive FEXT frames including the previous frame in the aforesaid step S39 (step S39: Yes), the receiving pattern memory is updated (step S41). Namely, the arrays A[0] to A[8] shown in FIG. 8 are shifted one by one, resulting in the arrays A[1] to A[9]. The next frame is then received (step S32), and the procedure is returned to the processing in the aforesaid step S31.

(4) when the previous frame is a NEXT frame and the frame during reception is also a NEXT frame, the receiving pattern memory is updated (step S42). Namely, the array A[0] shown in FIG. 8 is updated. In this case, the array A[0] is counted down by one since the NEXT frame is being received.

Then, it is determined whether seven consecutive NEXT frames including the frame during reception are received (step S43). When seven consecutive NEXT frames are received (step S43: Yes), a pattern up to that time is collated with the reference pattern 3. When they are the same, the frame counter is set at 334, and this processing is completed (step S44). Namely, the arrays A[0] to A[8] in the receiving pattern memory and the arrays REF[3, 0] to REF[3, 8] in the reference pattern 3 are compared, and it is determined whether they are the same. When they are the same, it can be determined that the frame during reception is frame number 334.

When they are not the same or when seven consecutive NEXT frames including the frame during reception are not received in the aforesaid step S43 (step S43: No), the next frame is received (step S32), and the procedure is returned to the processing in the aforesaid step S31.

Next, the performance of the hyperframe synchronization processing according to this embodiment will be explained based on FIG. 9. FIG. 9 is a diagram for explaining which frame number hyperframe synchronization can be secured at, provided that frame synchronization can be established at or before a certain frame number and then hyperframe synchronization can be started in the hyperframe shown in FIG. 27.

As shown in FIG. 9, in order to recognize the reference pattern 0, frame synchronization needs to be established at or before frame number 334 of the previous hyperframe. In this case, hyperframe synchronization can be established at frame number 47 of the hyperframe. In order to recognize the reference pattern 1, frame synchronization needs to be established at or before frame number 42. In this case, hyperframe synchronization can be established at frame number 144 of the hyperframe. In order to recognize the reference pattern 2, frame synchronization needs to be established at or before frame number 140. In this case, hyperframe synchronization can be established at frame number 237 of the hyperframe. In order to recognize the reference pattern 3, frame synchronization needs to be established at or before frame number 237. In this case, hyperframe synchronization can be established at frame number 334 of the hyperframe.

Accordingly, the establishment of hyperframe synchronization is classified into the following five patterns.

(1) When frame synchronization is established between frame numbers 0 and 42, hyperframe synchronization can be established at frame number 144.

(2) When frame synchronization is established between frame numbers 43 and 140, hyperframe synchronization can be established at frame number 237.

(3) When frame synchronization is established between frame numbers 141 and 237, hyperframe synchronization can be established at frame number 334.

(4) When frame synchronization is established between frame numbers 238 and 334, hyperframe synchronization can be established at frame number 47 of the next hyperframe.

(5) When frame synchronization is established between frame numbers 335 and 344, hyperframe synchronization can be established at frame number 144 of the next hyper frame.

If the average period of time from the establishment of frame synchronization to the establishment of hyperframe synchronization in the aforesaid cases is calculated with the length of a frame as a unit, the following answer is derived.

$$\frac{\sum_{i=0}^{42}(144-i)+\sum_{i=43}^{140}(237-i)+\sum_{i=141}^{237}(334-i)+\sum_{i=238}^{334}(345+47-i)+\sum_{i=335}^{344}(345+144-i)}{345}\approx 131.57 \quad \text{(Equation 2)}$$

Namely, a period of time corresponding to about 131. 6 frames on average is necessary before hyperframe synchronization is accomplished after the accomplishment of frame synchronization.

As described above, according to this embodiment, hyperframe synchronization can be established in a shorter period of time compared with the aforesaid first embodiment, since unique sequences of frames in the hyperframe are detected by using FEXT-NEXT differences. Namely, a period of time from the establishment of frame synchronization to the establishment of hyperframe synchronization can be made shorter than that in the first embodiment.

[Third Embodiment]

Although hyper frame synchronization is established by using differences between the numbers of consecutive FEXT frames and consecutive NEXT frames in the aforesaid second embodiment, hyperframe synchronization is established by using differences between the numbers of consecutive NEXT frames and consecutive FEXT frames in the third embodiment of the present invention. The more detailed explanation will be given below.

FIG. 10 is a diagram showing the number of consecutive NEXT frames in the rear portion denoted by the white area of each line, the number of consecutive FEXT frames in the front portion denoted by the hatched area of the next line, and a difference between these numbers of consecutive NEXT frames and consecutive FEXT frames in the hyperframe configuration shown in FIG. 27 in the table.

When an explanation is given with the 0.5 line as an example, as shown in FIG. 27, seven NEXT frames continue from frame number 4 to frame number 10 in the 0 line, and four FEXT frames continue from frame number 11 to frame number 14 in the 1st line. Accordingly, a difference between the number of consecutive NEXT frames and the number of consecutive FEXT frames in the next line is 3. This difference is referred to as a NEXT-FEXT difference hereinafter.

Figure 11:
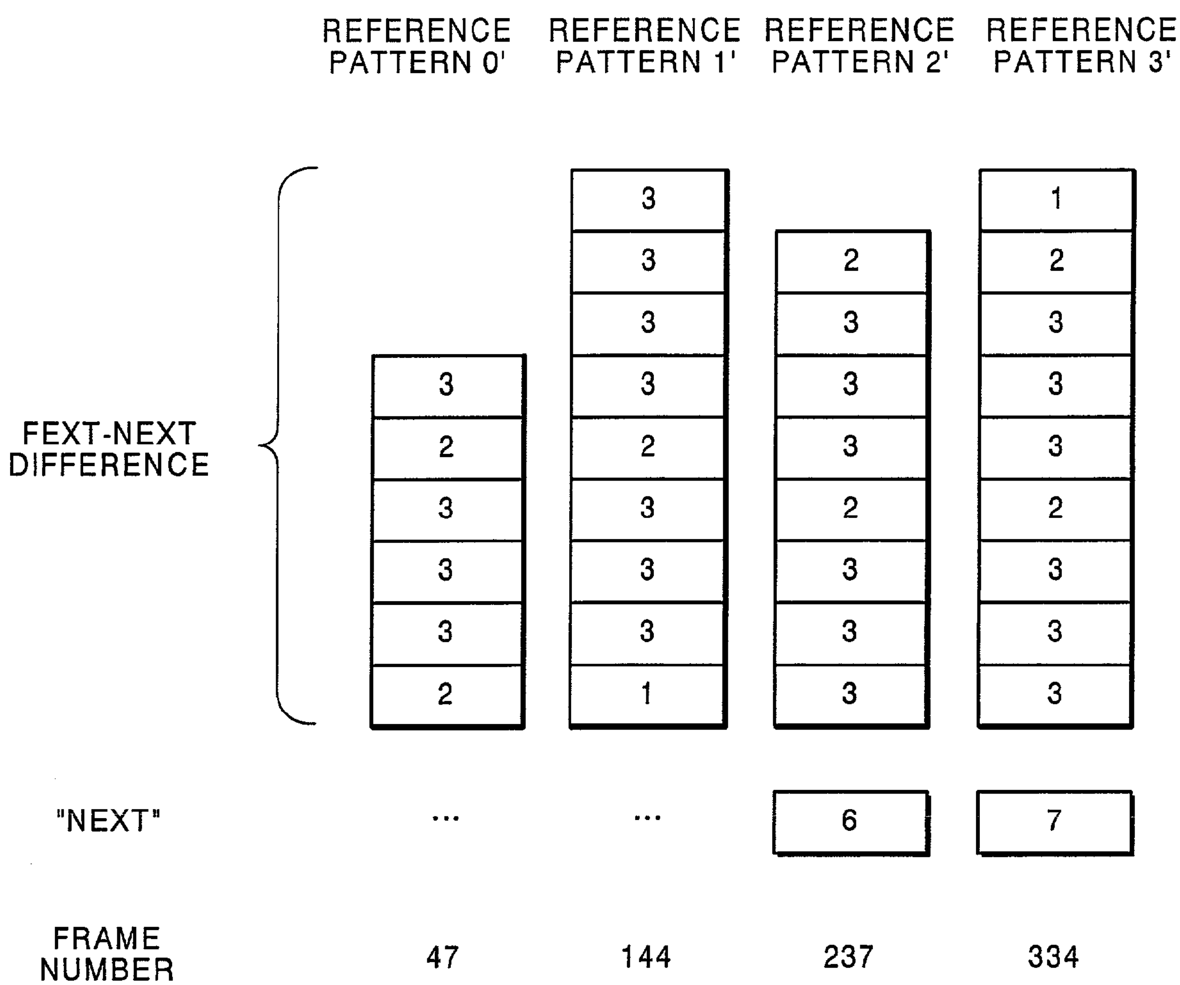
FIG. 11 is a diagram showing four unique sequences of NEXT-FEXT differences used in the third embodiment of the present invention.

When a sequence of NEXT-FEXT differences and the number of consecutive NEXT frames which follow the sequence are combined, four patterns of unique combination can be found. FIG. 11 is a diagram showing these four patterns of unique combination.

As shown in FIG. 11, a pattern in which NEXT-FEXT differences of 3, 2, 3, 3, 3, and 2 continue as in a reference pattern 0' applies to only frame number 47 in this hyperframe. For this reason, when this reference pattern 0' is detected, it can be determined that the frame during reception is frame number 47.

Incidentally, in this reference pattern 0', the reference pattern 0' can not be confirmed definitely until the NEXT frame of frame number 47 is received. This is because the continuation of four FEXT frames can be confirmed definitely and then 2 can be fixed as the NEXT-FEXT difference when the NEXT frame of frame number 47 is received, since there is a possibility that five consecutive FEXT frames are transmitted in this hyperframe.

Further, a pattern in which NEXT-FEXT differences of 3, 3, 3, 3, 2, 3, 3, 3, and 1 continue, for example, as in a reference pattern 1' applies to only frame number 144 in this hyperframe. Therefore, when this reference pattern 1' is detected, it can be determined that the frame during reception is frame number 144.

Incidentally, in this reference pattern 1', the reference pattern 1' can be confirmed definitely when the FEXT frame of frame number 144 is received. This is because the continuation of five FEXT frames can be confirmed definitely and then 1 can be fixed as the NEXT-FEXT difference when the FEXT frame of frame number 144 is received, since there is no possibility that more than five consecutive FEXT frames are transmitted in this hyperframe.

Similarly, when the receiver receives a reference pattern 2', it can be determined that the frame number of the frame during reception is 237. When the receiver receives a reference pattern 3', it can be determined that the frame number of the frame during reception is 334. In these reference patterns 2' and 3', the frame number of a frame during reception can be specified by NEXT-FEXT differences and the count of the number of consecutive NEXT frames which follow the FEXT frames.

FIG. 12 is a diagram showing the reference pattern 0' to the reference pattern 3' shown in FIG. 11 in the form of arrays. Namely, the reference pattern 0' to the reference pattern 3' are stored respectively in arrays REF[0', 0] to REF[0', 5], arrays REF[1', 0] to REF[1', 8], arrays REF[2', 0] to REF[2', 8], and arrays REF[3', 0] to REF[3', 9].

Figure 13:
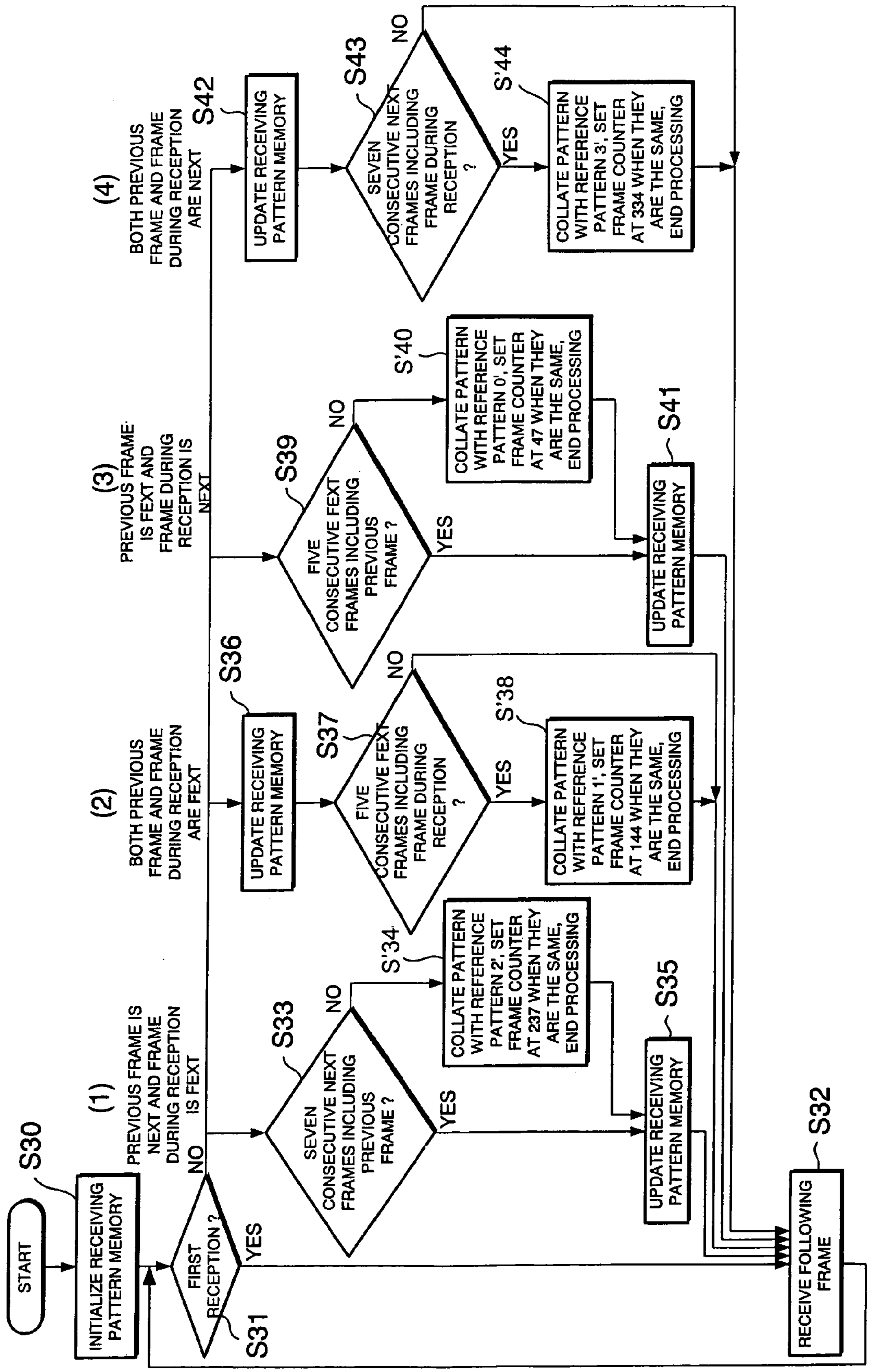
FIG. 13 is a flowchart explaining hyperframe synchronization processing in the third embodiment of the present invention.

Next, hyperframe synchronization processing according to this embodiment will be explained based on a flowchart shown in FIG. 13. This hyper frame synchronization processing shown in FIG. 13 is also started when frame synchronization is established as in the aforesaid second embodiment.

This hyperframe synchronization processing in this embodiment is similar to that in the second embodiment shown in FIG. 7 except for the following point. Namely, in this embodiment, arrays B[0] to B[9] are stored in the receiving pattern memory. FIG. 14 is a table explaining the contents of these arrays B[0] to B[9].

As shown in FIG. 14, in the array B[0], during reception of a NEXT frame, the number of consecutive NEXT frames before the frame during reception is stored, whereas during reception of an FEXT frame, a difference between the number of the aforesaid number of consecutive NEXT frames and the number of consecutive FEXT frames before the frame during reception is stored.

The arrays B[1] to B[9] store differences between the numbers of consecutive NEXT frames and consecutive FEXT frames in the line from the first line before to the ninth line before, respectively. Namely, in the arrays B[1] to B[9], NEXT-FEXT differences up to the ninth line before are stored. The reason why ten arrays B[0] to B[9] are prepared is that nine arrays B[1] to B [9] are required to store NEXT-FEXT differences in the reference pattern 3' shown in FIG. 11, and in addition that one array B[0] is required to count the number of frames which are now being received.

In the flowchart shown in FIG. 13, step S34', step S38', step S40', and step S44' are performed in place of step S34, step S38, step S40, and step S44 in the flowchart in FIG. 7 in the aforesaid second embodiment.

In step S34', a frame pattern received up to that time is collated with the reference pattern 2'. When they are the same, the frame counter is set at 237, and this processing is completed. Namely, the arrays B[0] to B[8] in the receiving pattern memory and the arrays REF[2', 0] to REF[2', 8] of the reference pattern 2' are compared, and it is determined whether they are the same. When they are the same, it can be determined that the frame during reception is frame number 237.

In step S38', a frame pattern received up to that time is collated with the reference pattern 1'. When they are the same, the frame counter is set at 144, and this processing is completed. Namely, the arrays B[0] to B[8] in the receiving pattern memory and the arrays REF[1', 0] to REF [1', 8] of the reference pattern 1' are compared, and it is determined whether they are the same. When they are the same, it can be determined that the frame during reception is frame number 144.

In step S40', a frame pattern received up to that time is collated with the reference pattern 0'. When they are the same, the frame counter is set at 47, and this processing is completed. Namely, the arrays B[0] to B[5] in the receiving pattern memory and the arrays REFP[0', 0] to REF[0', 5] of the reference pattern 0' are compared, and it is determined whether they are the same. When they are the same, it can be determined that the frame during reception is frame number 47.

In step S44', a frame pattern received up to that time is collated with the reference pattern 3'. When they are the same, the frame counter is set at 334, and this processing is completed. Namely, the arrays B[0] to B[9] in the receiving pattern memory and the arrays REF[3', 0] to REF[3', 9] of the reference pattern 3' are compared, and it is determined whether they are the same. When they are the same, it can be determined that the frame during reception is frame number 334.

Since the hyperframe synchronization processing in this embodiment is the same as in the aforesaid second embodiment except for the aforesaid point, the detailed explanation thereof is omitted here.

Figure 15:
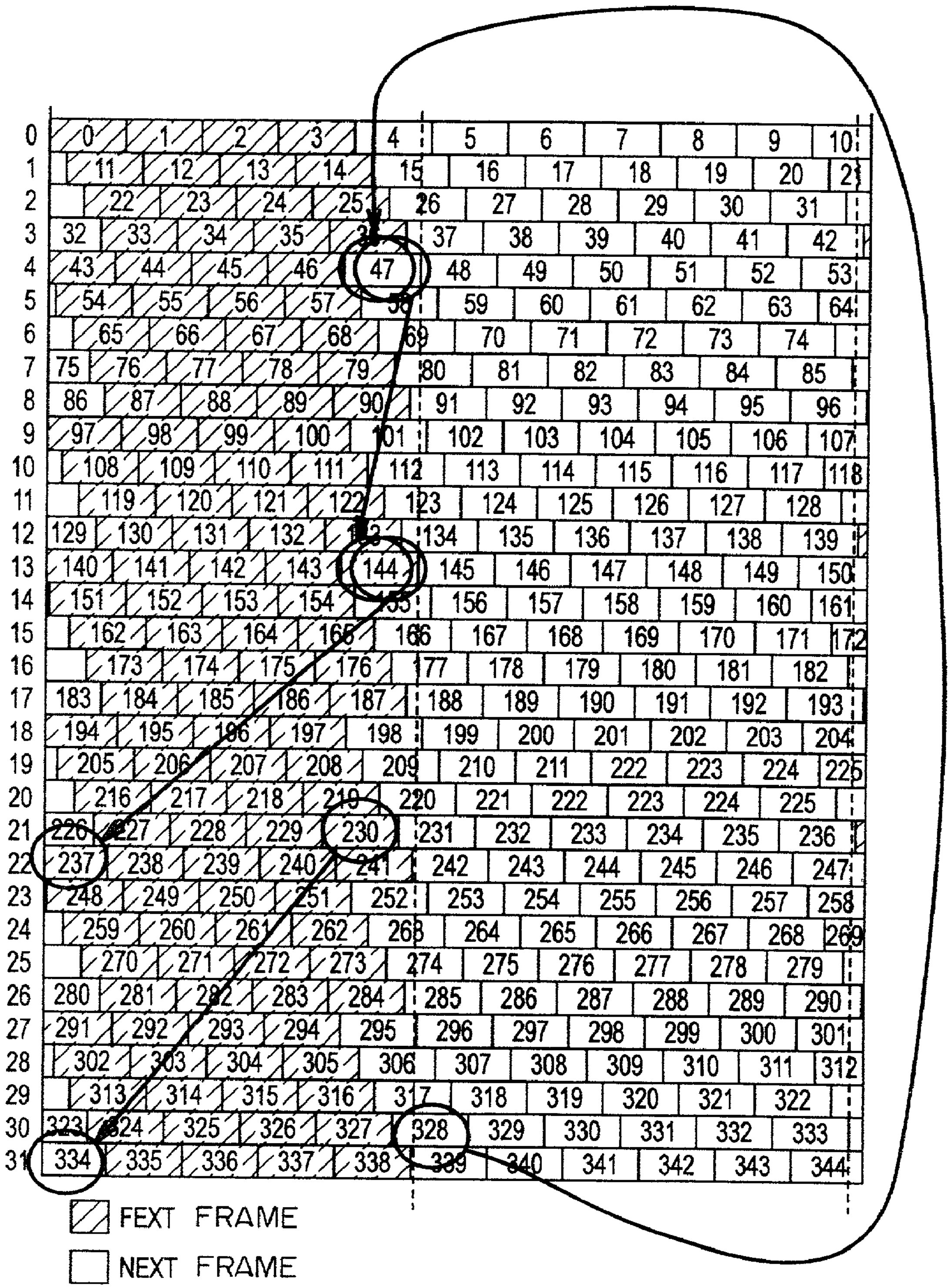
FIG. 15 is a diagram showing the configuration of a hyperframe used when the performance of the third embodiment of the present invention is considered.

Next, the performance of the hyperframe synchronization processing according to this embodiment will be explained based on FIG. 15. FIG. 15 is a diagram for explaining which frame number hyperframe synchronization can be secured at, provided that frame synchronization can be established at or before a certain frame number and then hyperframe synchronization can be started in the hyperframe shown in FIG. 27.

As shown in FIG. 15, in order to recognize the reference pattern 0', frame synchronization needs to be established at or before frame number 328 of the previous hyperframe. In this case, hyperframe synchronization can be established at frame number 47 of the hyperframe. In order to recognize the reference pattern 1', frame synchronization needs to be established at or before frame number 47. In this case, hyperframe synchronization can be established at frame number 144 of the hyperframe. In order to recognize the reference pattern 2', frame synchronization needs to be established at or before frame number 144. In this case, hyperframe synchronization can be established at frame number 237 of the hyperframe. In order to recognize the reference pattern 3', frame synchronization needs to be established at or before frame number 230. In this case, hyperframe synchronization can be established at frame number 334 of the hyperframe.

Accordingly, the establishment of hyperframe synchronization is classified into the following five patterns.

(1) When frame synchronization is established between frame numbers 0 and 47, hyperframe synchronization can be established at frame number 144.

(2) When frame synchronization is established between frame numbers 48 and 144, hyperframe synchronization can be established at frame number 237.

(3) When frame synchronization is established between frame numbers 145 and 230, hyperframe synchronization can be established at frame number 334.

(4) When frame synchronization is established between frame numbers 231 and 328, hyperframe synchronization can be established at frame number 47 of the next hyperframe.

(5) When frame synchronization is established between frame numbers 329 and 344, hyperframe synchronization can be established at frame number 144 of the next hyperframe.

If the average period of time from the establishment of frame synchronization to the establishment of hyperframe synchronization in the aforesaid cases is calculated with the length of a frame as a unit, the following answer is derived.

$$\frac{\sum_{i=0}^{47}(144-i)+\sum_{i=48}^{144}(237-i)+\sum_{i=145}^{230}(334-i)+\sum_{i=231}^{328}(345+47-i)+\sum_{i=329}^{344}(345+144-i)}{345}\approx 131.96 \quad \text{(Equation 3)}$$

Namely, a period of time corresponding to about 132.0 frames on average is necessary before hyperframe synchronization is accomplished after the accomplishment of frame synchronization.

As described above, according to this embodiment, hyperframe synchronization can be established in a shorter period of time compared with the aforesaid first embodiment, since unique sequences of frames in the hyperframe are detected by using NEXT-FEXT differences. Namely, a period of time from the establishment of frame synchronization to the establishment of hyperframe synchronization can be made shorter than that in the first embodiment.

[Fourth Embodiment]

The fourth embodiment of the present invention is designed to shorten a period of time from the establishment of frame synchronization to the establishment of hyperframe synchronization as much as possible by combining the aforesaid FEXT-NEXT differences and NEXT-FEXT differences. This will be explained below in more detail.

FIG. 16 is a diagram showing the relation between the timing of establishment of frame synchronization and the timing of establishment of hyperframe synchronization when FEXT-NEXT differences are used as in the aforesaid second embodiment in the table. FIG. 17 is a diagram showing the relation between the timing of establishment of frame synchronization and the timing of establishment of hyperframe synchronization when NEXT-FEXT differences are used as in the aforesaid third embodiment in the table.

As can be seen from FIG. 16 and FIG. 17, both when FEXT-NEXT differences are used and when NEXT-FEXT differences are used, frame numbers at which hyperframe synchronization can be established are 47, 144, 237, and 334 in both cases. The criterion for evaluating which method is superior is a period of time from the establishment of frame synchronization to the establishment of hyperframe synchronization. One method requiring a shorter period is superior than the other.

For example, the reference pattern 0 using FEXT-NEXT differences shown in FIG. 16 and the reference pattern 0' using NEXT-FEXT differences shown in FIG. 17 are compared. In the reference pattern 0, hyperframe synchronization can be established at frame number 47 of the next hyperframe if frame synchronization is established at or before frame number 334. Meanwhile, in the reference pattern 0', hyperframe synchronization can not be established at frame number 47 of the next hyperframe unless frame synchronization is established at or before frame number 328. Namely, in the reference pattern 0', if frame synchronization is established on and after frame number 329, hyperframe synchronization can not be established at or before frame number 144 of the next hyperframe. Accordingly, in this case, the reference pattern 0 which uses FEXT-NEXT differences is superior to the reference pattern 0' which uses NEXT-FEXT differences.

If the reference pattern 1 using FEXT-NEXT differences shown in FIG. 16 and the reference pattern 1' using NEXT-FEXT differences shown in FIG. 17 are compared in the same way as above, it is known that the reference pattern 1' is superior. If the reference pattern 2 using FEXT-NEXT differences shown in FIG. 16 and the reference pattern 2' using NEXT-FEXT differences shown in FIG. 17 are compared, it is known that the reference pattern 2' is superior. If the reference pattern 3 using FEXT-NEXT differences shown in FIG. 16 and the reference pattern 3' using NEXT-FEXT differences shown in FIG. 17 are compared, it is known that the reference pattern 3 is superior.

Thus, in this embodiment, hyperframe synchronization is performed by using the superior of both the reference patterns. FIG. 18 is a diagram showing the relation between the timing of establishment of frame synchronization and the timing of establishment of hyperframe synchronization when the superior of both the reference patterns is used in the table.

Figure 19:
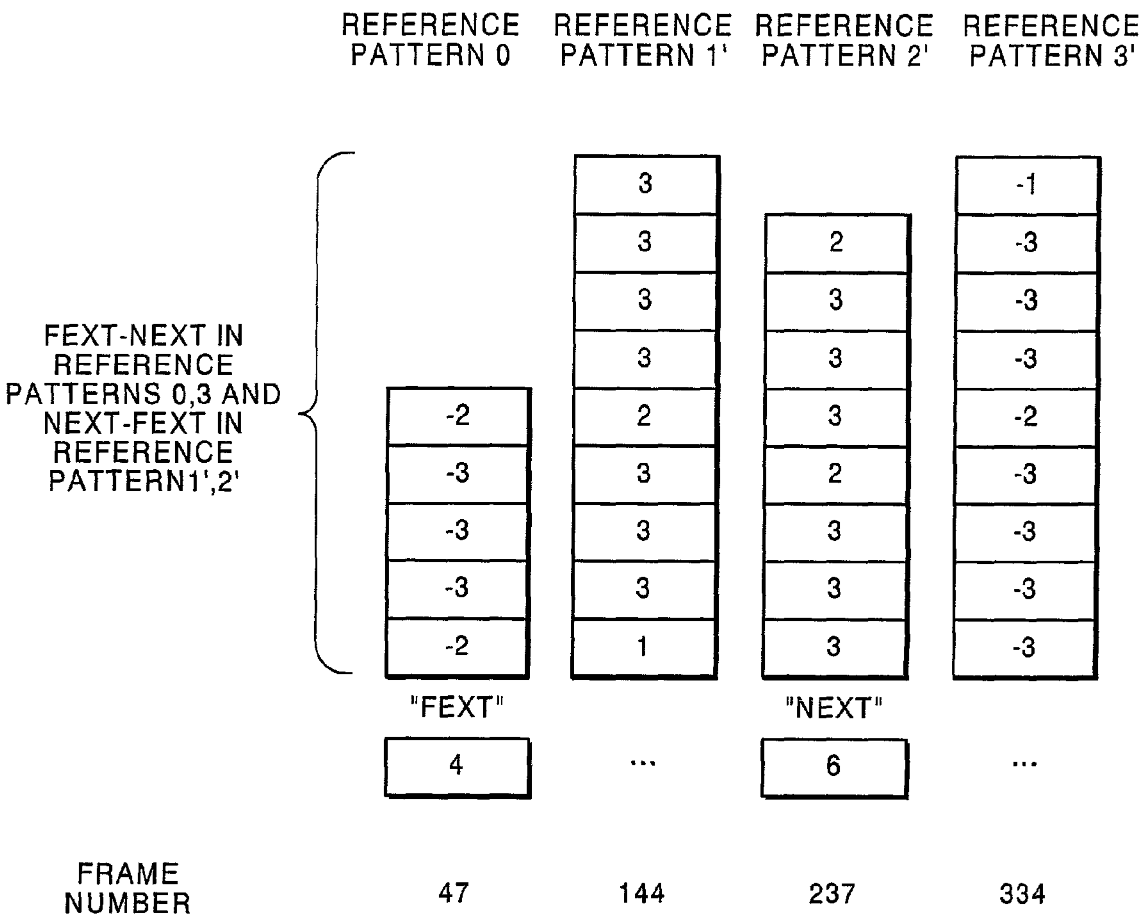
FIG. 19 is a diagram showing four unique sequences of FEXT-NEXT differences and NEXT-FEXT differences used in a fourth embodiment of the present invention.

FIG. 19 is a diagram showing unique sequences for detecting the reference patterns shown in FIG. 18. In FIG. 19, as for the reference pattern 0, the sequence of FEXT-NEXT differences shown in FIG. 5 and the number of FEXT frames subsequent to this sequence are used for hyperframe synchronization. As for the reference pattern 1', the sequence of NEXT-FEXT differences shown in FIG. 11 is used for hyperframe synchronization. As for the reference pattern 2', the sequence of NEXT-FEXT differences shown in FIG. 11 and the number of NEXT frames subsequent to this sequence are used for hyperframe synchronization. As for the reference pattern 3, the sequence of FEXT-NEXT differences shown in FIG. 5 is used for hyperframe synchronization.

FIG. 20 is a diagram showing the reference pattern 0, the reference pattern 1', the reference pattern 2', and the reference pattern 3 shown in FIG. 19 in the form of arrays. Namely, the reference pattern 0 is stored in the arrays REF[0, 0] to REF[0, 5], the reference pattern 1' is stored in the arrays REF[1', 0] to REF[1', 8], the reference pattern 2' is stored in the arrays REF[2', 0] to REF[2', 8], and the reference pattern 3 is stored in the arrays REF[3, 0] to REF[3, 8]. Although numerical values of the arrays REF[0, 0] to REF[0, 5] of the reference pattern 0 and the arrays REF[3, 0] to REF[3, 8] of the reference pattern 3 are absolute values, it is insignificant as long as the arrays A[0] to A[8] in the receiving pattern memory are set at absolute values. The numerical values of these arrays REF[0, 0] to REF[0, 5] of the reference pattern 0 and the arrays REF[3, 0] to REF[3, 8] of the reference pattern 3 may be processed as negatives.

Figure 21:
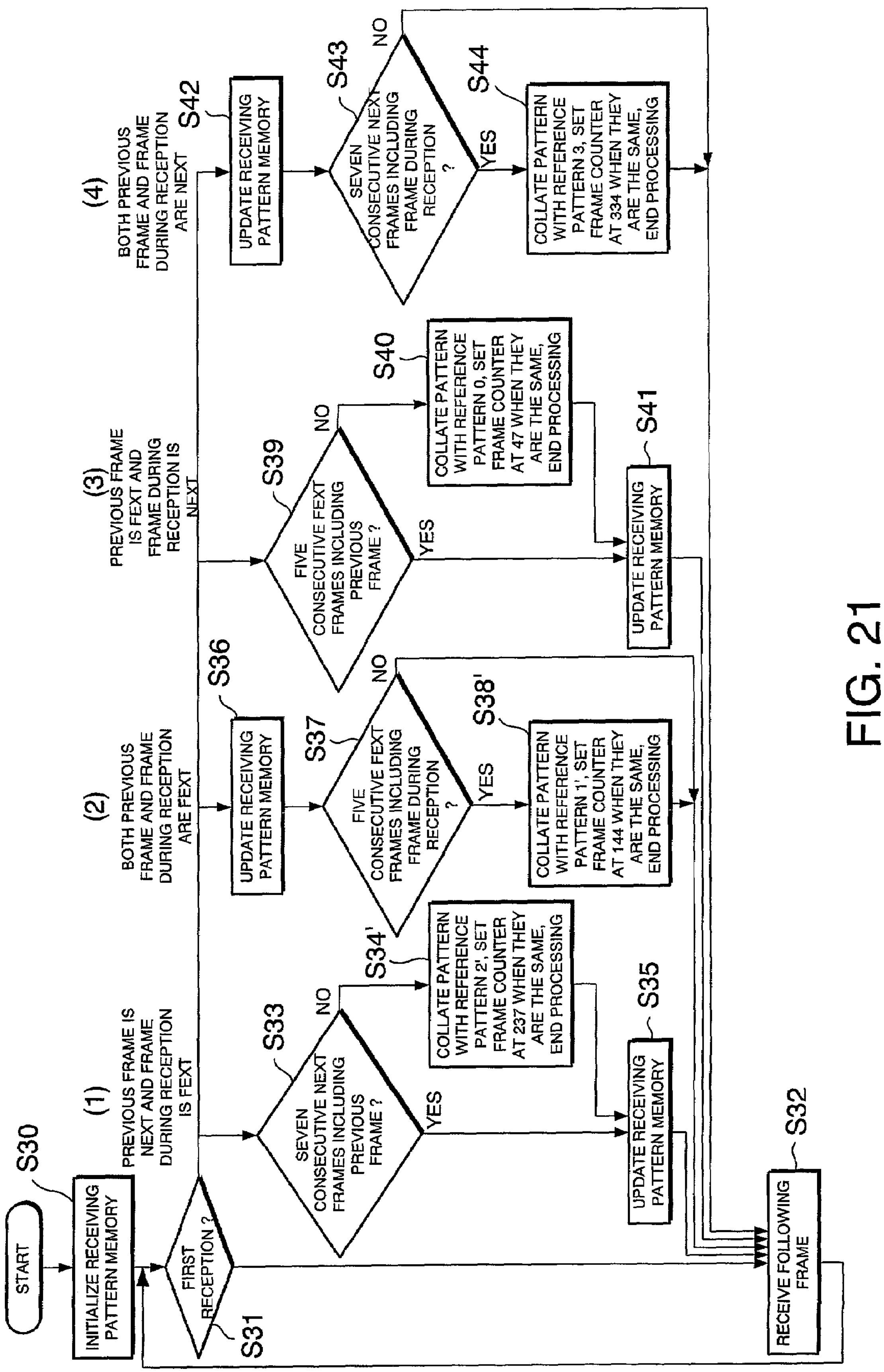
FIG. 21 is a flowchart explaining hyperframe synchronization processing in the fourth embodiment of the present invention.

Next, hyperframe synchronization processing according to this embodiment will be explained based on a flowchart shown in FIG. 21. The hyperframe synchronization processing shown in FIG. 21 is started when frame synchronization is established. Processing in this flowchart is summarized as a combination of processing in the aforesaid second embodiment and the third embodiment.

In a more detailed explanation, when this hyperframe synchronization processing is started, a receiving pattern memory is initialized (step S30). In this embodiment, arrays A[0] to A[8] and arrays B[0] to B[8] are stored in the receiving pattern memory. FIG. 22 is a table explaining the contents of the arrays A[0] to A[8]. These arrays A[0] to A[8] is fewer in number than those shown in FIG. 8 in the second embodiment by one. Except for this point, they are the same as those in FIG. 8.

FIG. 23 is a table explaining the contents of the arrays B[0] to B[8] . These arrays B[0] to B[8]is fewer in number than those shown in FIG. 14 in the third embodiment by one. Except for this point, they are the same as those in FIG. 14.

As shown in FIG. 21, subsequently, it is determined whether the first frame is received in the hyperframe synchronization processing (step S31). When the first frame is received (step S31: Yes), the next frame is received (step S32), and the procedure is returned to processing in step S31.

When the first frame is not received (step S31: No), there are the following cases: (1) the previous frame is a NEXT frame, and the frame during reception is a FEXT frame; (2)the previous frame is a FEXT frame, and the frame during reception is also a FEXT frame; (3) the previous frame is a FEXT frame, and the frame during reception is a NEXT frame; and (4) the previous frame is a NEXT frame and the frame during reception is also a NEXT frame.

(1) When the previous frame is a NEXT frame, and the frame during reception is a FEXT frame, it is determined whether there exist seven consecutive NEXT frames including the previous frame (step S33). When seven consecutive NEXT frames do not exist (step S33: No), that is, when there exist six consecutive NEXT frames, a receiving frame pattern up to that time is collated with the reference pattern 2'. When they are the same, the frame counter is set at 237, and this processing is completed (step S34'). Namely, the arrays B[0] to B[8] in the receiving pattern memory and the arrays REF[2', 0] to REF[2', 8] in the reference pattern 2' are compared, and it is determined whether they are the same. When they are the same, it can be determined that the frame during reception is frame number 237.

When they are not the same or when there exist seven consecutive NEXT frames including the previous frame in the aforesaid step S33 (step S33: Yes), the receiving pattern memory is updated (step S35). Namely, the arrays A[0] to A[7] shown in FIG. 22 are shifted one by one, resulting in the arrays A[1] to A[8]. Moreover, the arrays B[0] to B[7] shown in FIG. 23 are shifted one by one, resulting in the arrays B[1] to B [8]. The next frame is then received (step S32), and the procedure is returned to the processing in the aforesaid step S31.

(2) When the previous frame is a FEXT frame, and the frame during reception is also a FEXT frame, the receiving pattern memory is updated (step S36). Namely, the array A[0 ] shown in FIG. 22 and the array B[0] shown in FIG. 23 are updated. In this case, the array A[0] is counted up by one and the array B[0] is counted down by one since the FEXT frame is being received.

Then, it is determined whether five consecutive FEXT frames including the frame during reception are received (step S37). when five consecutive FEXT frames are received (step S37: Yes), a frame pattern received up to that time is collated with the reference pattern 1'. When they are the same, the frame counter is set at 144, and this processing is completed (step S38'). Namely, the arrays B[0] to B[8] in the receiving pattern memory and the arrays REF[1', 0] to REF[1', 8] in the reference pattern 1' are compared, and it is determined whether they are the same. When they are the same, it can be determined that the frame during reception is frame number 144.

When they are not the same or when five consecutive FEXT frames including the frame during reception are not received in the aforesaid step S37 (step S37: No), the next frame is received (step S32), and the procedure is returned to the processing in the aforesaid step S31.

(3) When the previous frame is a FEXT frame, and the frame during reception is a NEXT frame, it is determined whether there exist five consecutive FEXT frames including the previous frame (step S39). When five consecutive FEXT frames do not exist (step S39: No), that is, when there exist four consecutive FEXT frames, a pattern up to that time is collated with the reference pattern 0. When they are the same, the frame counter is set at 47, and this processing is completed (step S40). Namely, the arrays A[0] to A[5] in the receiving pattern memory and the arrays REF[0, 0] to REF[0, 5] in the reference pattern 0 are compared, and it is determined whether they are the same. When they are the same, it can be determined that the frame during reception is frame number 47.

When they are not the same or when there exist five consecutive FEXT frames including the previous frame in the aforesaid step S39 (step S39: Yes), the receiving pattern memory is updated (step S41). Namely, the arrays A[0] to A[7] shown in FIG. 22 are shifted one by one, resulting in the arrays A[1] to A[8]. Moreover, the arrays B[0] to B[7] shown in FIG. 23 are shifted one by one, resulting in the arrays B[1] to B[8]. The next frame is then received (step S32), and the procedure is returned to the processing in the aforesaid step S31.

(4) when the previous frame is a NEXT frame and the frame during reception is also a NEXT frame, the receiving pattern memory is updated (step S42). Namely, the array A[0] shown in FIG. 22 and the array B[0] shown in FIG. 23 are updated. In this case, the array A[0] is counted down by one and the array B[0 ] is counted up by one since the NEXT frame is being received.

Then, it is determined whether seven consecutive NEXT frames including the frame during reception are received (step S43). When seven consecutive NEXT frames are received (step S43: Yes), a pattern up to that time is collated with the reference pattern 3. When they are the same, the frame counter is set at 334, and this processing is completed. Namely, the arrays A[0] to A[8] in the receiving pattern memory and the arrays REF [3, 0] to REF [3, 8] in the reference pattern 3 are compared, and it is determined whether they are the same (step S44). When they are the same, it can be determined that the frame during reception is frame number 334.

When they are not the same or when seven consecutive NEXT frames including the frame during reception are not received in the aforesaid step S43 (step S43: No), the next frame is received (step S32), and the procedure is returned to the processing in the aforesaid step S31.

Figure 24:
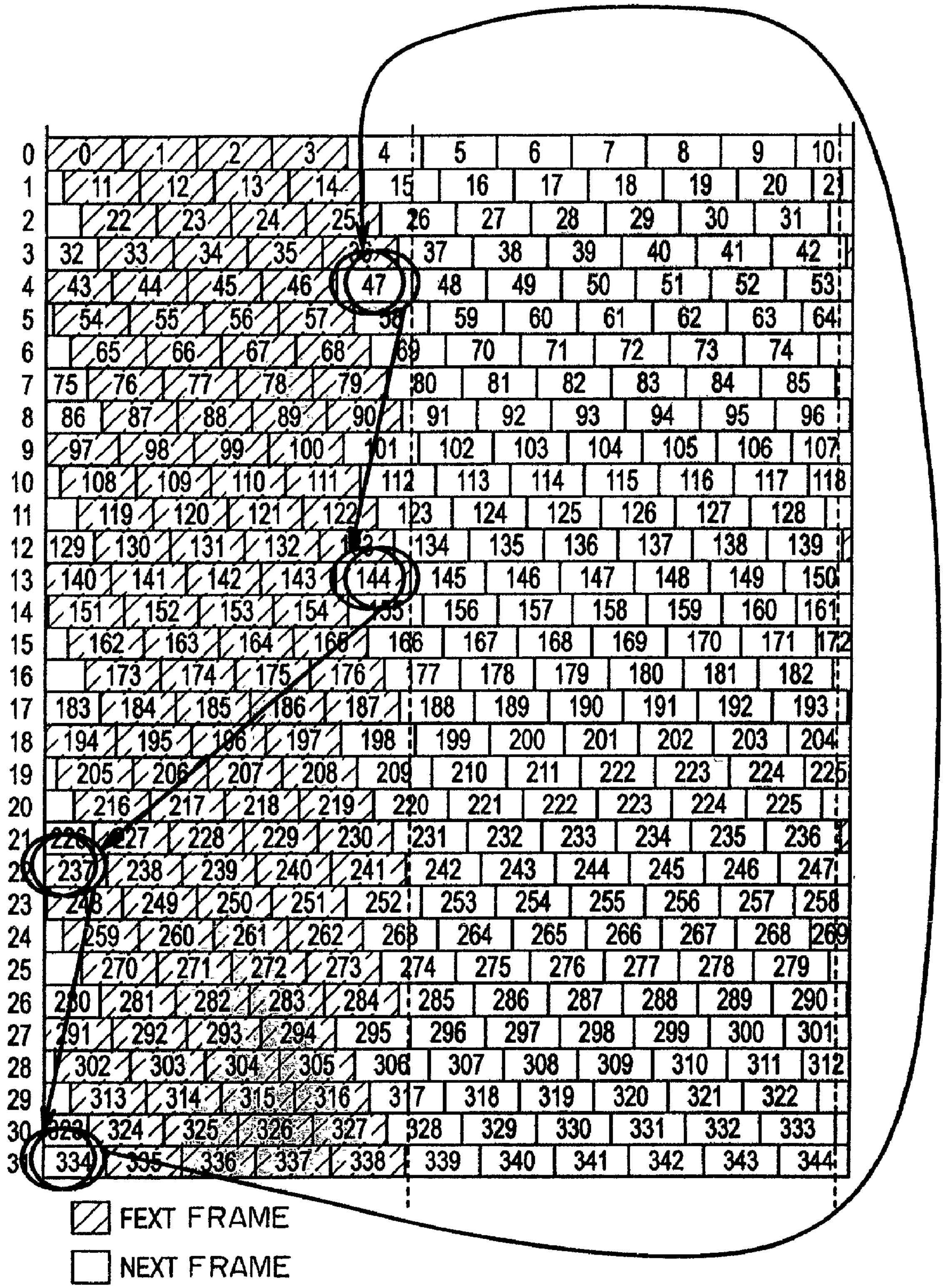
FIG. 24 is a diagram showing the configuration of a hyperframe used when the performance of the fourth embodiment of the present invention is considered.

Next, the performance of the hyperframe synchronization processing according to this embodiment will be explained based on FIG. 24. FIG. 24 is a diagram for explaining which frame number hyperframe synchronization can be secured at, provided that frame synchronization can be established at or before a certain frame number and then hyperframe synchronization can be started in the hyperframe shown in FIG. 27.

As shown in FIG. 24, in order to recognize the reference pattern 0, frame synchronization needs to be established at or before frame number 334 of the previous hyperframe. In this case, hyperframe synchronization can be established at frame number 47 of the hyperframe. In order to recognize the reference pattern 1', frame synchronization needs to be established at or before frame number 47. In this case, hyperframe synchronization can be established at frame number 144 of the hyperframe. In order to recognize the reference pattern 2', frame synchronization needs to be established at or before frame number 144. In this case, hyperframe synchronization can be established at frame number 237 of the hyperframe. In order to recognize the reference pattern 3, frame synchronization needs to be established at or before frame number 237. In this case, hyperframe synchronization can be established at frame number 334 of the hyperframe.

Accordingly, the establishment of hyperframe synchronization is classified into the following five patterns.

(1) When frame synchronization is established between frame numbers 0 and 47, hyperframe synchronization can be established at frame number 144.

(2) When frame synchronization is established between frame numbers 48 and 144, hyperframe synchronization can be established at frame number 237.

(3) When frame synchronization is established between frame numbers 145 and 237, hyperframe synchronization can be established at frame number 334.

(4) When frame synchronization is established between frame numbers 238 and 334, hyperframe synchronization can be established at frame number 47 of the next hyperframe.

(5) When frame synchronization is established between frame numbers 335 and 344, hyperframe synchronization can be established at frame number 144 of the next hyperframe.

If the average period of time from the establishment of frame synchronization to the establishment of hyperframe synchronization in the aforesaid cases is calculated with the length of a frame as a unit, the following answer is derived.

$$\frac{\sum_{i=0}^{47}(144-i)+\sum_{i=48}^{144}(237-i)+\sum_{i=145}^{237}(334-i)+\sum_{i=238}^{334}(345+47-i)+\sum_{i=325}^{344}(345+144-i)}{345}\approx 129.09 \qquad \text{(Equation 4)}$$

Namely, a period of time corresponding to about 129.1 frames on average is necessary before hyperframe synchronization is accomplished after the accomplishment of frame synchronization. When frame synchronization is established at 48 or 237, it takes the longest period of time which corresponds to 189 frames each.

Therefore, according to this embodiment, the average period of time from frame synchronization to hyperframe synchronization can be shortened to 129.1/246.7=about 52.3% as compared with the aforesaid first embodiment. Even in the case requiring the longest period of time, the period can be shortened to 189/349=about 54.2%.

As described above, according to this embodiment, hyperframe synchronization can be established in a shorter period of time compared with the aforesaid first to third embodiments, since unique sequences of frames in the hyperframe are detected by using combination of FEXT-NEXT differences and NEXT-FEXT differences. Namely, hyperframe synchronization is performed by using sequences by which hyperframe synchronization can be established more quickly, and hence hyperframe synchronization can be established in a still shorter period of time than in the aforesaid second and third embodiments. Consequently, the period of time from the establishment of frame synchronization to the establishment of hyperframe synchronization can be made shorter as much as possible.

It should be mentioned that the present invention is not limited to the aforesaid embodiments and can be modified variously. For example, the present invention is explained with the hyperframe in conformity with Annex C of the ITU-T Recommendations G.992.1 and G.992.2 as an example in the aforesaid embodiments, but the present invention is not limited to this. Moreover,the present invention is explained with the case where the FEXT frame is used as an example of a first frame and the NEXT frame is used as an example of a second frame as an example, but the present invention is not limited to this.

The present invention can be applied to any communication method as long as first frames and second frames, which are distinguishable from each other, form groups respectively to compose first frame groups and second frame groups, and these plurality of first and second frame groups compose one hyperframe in the communication method.

Figure 25:
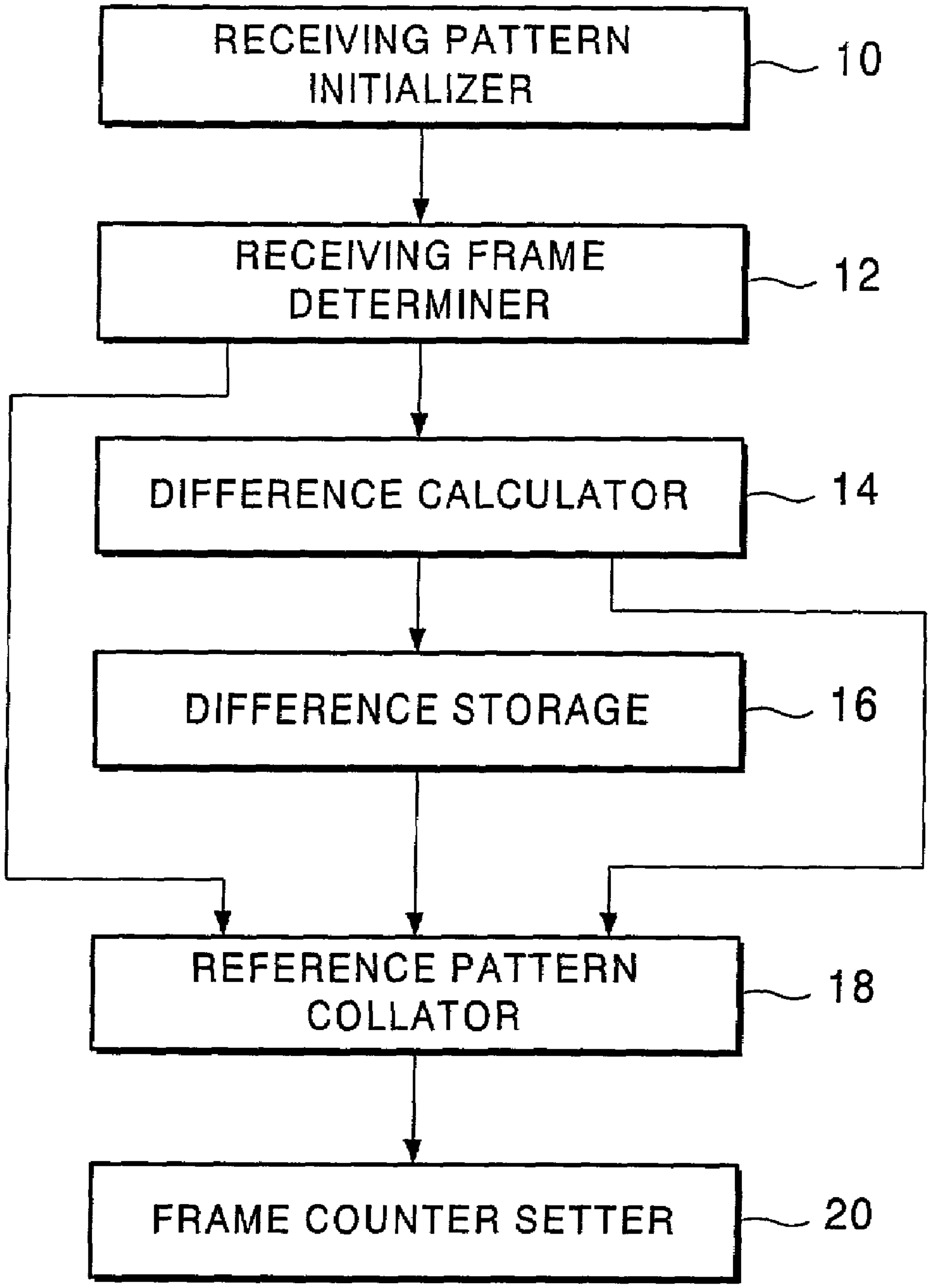
FIG. 25 is a block diagram showing a configuration when the respective embodiments of the present invention are realized in terms of hardware.

Furthermore, the present invention can be realized in terms of hardware, and also realized in terms of software through the use of a computer. FIG. 25 is a block diagram showing an example of a configuration in the case where the aforesaid embodiments are realized in terms of hardware. As shown in FIG. 25, a receiving pattern initializer 10 initializes a receiving pattern memory. A receiving frame determiner 12 determines whether a received frame is an FEXT frame or a Next frame. A difference calculator 14 calculates a difference between the number of consecutive FEXT frames and the number of consecutive NEXT frames. This difference calculator 14 calculates, for example, FEXT-NEXT differences in the aforesaid second embodiment, NEXT-FEXT differences in the aforesaid third embodiment, and both of them in the aforesaid fourth embodiment.

A difference storage 16 stores differences calculated by the difference calculator 14. A reference pattern collator 18 performs collation with a reference pattern based on results determined by the receiving frame determiner 12, results calculated by the difference calculator 14, and results stored by the difference storage 16, and determines whether a received frame pattern and the reference pattern are the same. When they are the same, a frame counter is set by a frame counter setter 20.

Figure 26:
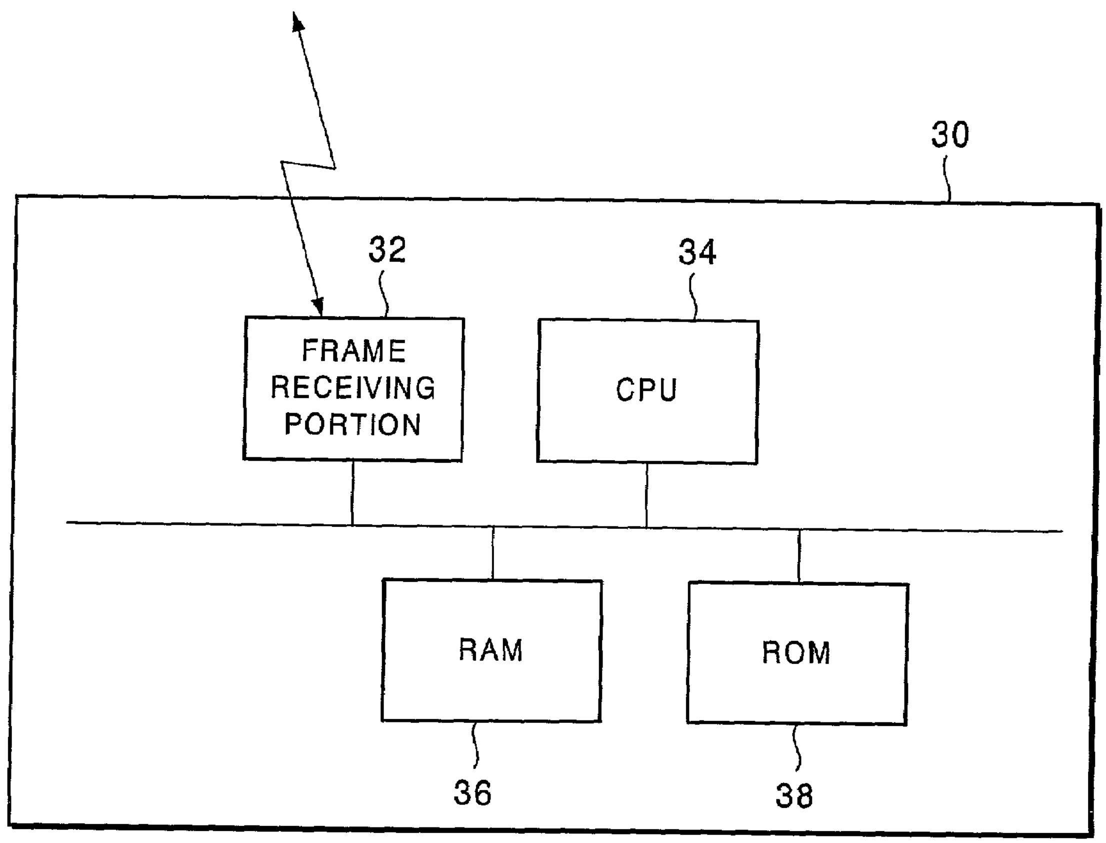
FIG. 26 is a block diagram showing a configuration of a receiver when the respective embodiments of the present invention are realized in terms of software.

In the case of realization in terms of software, the receiver may have a hardware configuration as shown in FIG. 26. FIG. 26 is a diagram showing an example of a configuration of the receiver 30 in the case where the aforesaid embodiments are realized in terms of software. The receiver 30 has a frame receiving portion 32, a CPU 34, a RAM 36 and ROM 38, which are connected to one another by internal bus.

In such a receiver 30, a program for executing a variety of processing explained in the aforesaid embodiments is stored in the RAM 36 and/or the ROM 38. The frame receiving portion 32 receives the frames transmitted from the station. The CPU 34 reads the program from the RAM 36 and/or ROM 38, and executes it for the frames received in the frame receiving portion 32.

Moreover, a program for the aforesaid embodiments can be distributed in the form of a record medium by being recorded on the record medium such as a floppy disk, a CD-ROM (Compact Disc-Read Only Memory), a ROM, a memory card, or the like. In this case, the receiver 30 reads the record medium on which this program is recorded and executes it, whereby the aforesaid embodiments can be realized.

Moreover, the receiver 30 sometimes has other programs such as an operating system, other application programs, and the like, in which case it is suitable that by the use of other programs possessed by the receiver 30, an instruction for calling a program which realizes processing equal to that in the aforesaid embodiments out of the programs possessed by the receiver 30 be recorded on the record medium.

Further, such a program can be distributed not in the form of the record medium but in the form of a carrier wave via a network. The program transmitted in the form of the carrier wave over the network is incorporated in the receiver 30, and the aforesaid embodiments can be realized by executing this program.

Furthermore, when being recorded on the record medium or transmitted as the carrier wave over the network, the program is sometimes encoded or compressed. In this case, the receiver 30 which has read the program out of the record medium or the carrier wave needs to execute the program after decoding or expanding it.

As explained above, according to the present invention, hyperframe synchronization is performed after frame synchronization by skillfully using differences between the numbers of consecutive first frames and second frames which are distinguishable from each other, whereby hyperframe synchronization can be established in the shortest possible time.

What is claimed is:

1. A hyperframe synchronization processing apparatus for establishing synchronization of a hyperframe which has a plurality of first frame groups each including one or a plurality of first frames and a plurality of second frame groups each including one or a plurality of second frames distinguishable from the first frames and in which the first frame groups and the second frame groups appear alternately, the hyperframe synchronization processing apparatus comprising:

- a difference calculator configured to calculate differences between the number of the first frames included in the respective first frame groups and the number of the second frames included in the respective second frame groups which follow these respective first frame groups in the received hyperframe;
- a storage configured to sequentially store the differences calculated by the difference calculator; and
- a synchronizer configured to establish the synchronization of the hyperframe by using the differences stored in the storage.

2. The hyperframe synchronization processing apparatus according to claim 1, wherein the synchronizer establishes the synchronization of the hyperframe by detecting a unique sequence capable of specifying a position in the hyperframe out of sequences of the differences between the number of the first frames included in the respective first frame groups and the number of the second frames included in the respective second frame groups.

3. The hyperframe synchronization processing apparatus according to claim 2, wherein the synchronizer establishes the synchronization of the hyperframe by further using the number of times the first frames have been received consecutively.

4. The hyperframe synchronization processing apparatus according to claim 1, wherein the first frame is the top frame in the hyperframe.

5. The hyperframe synchronization processing apparatus according to claim 1, wherein the second frame is the top frame in the hyperframe.

6. The hyperframe synchronization processing apparatus according to claim 1, wherein the first frame is an FEXT frame and the second frame is a NEXT frame in at least one of ITU-T Recommendations G.992.1, version from 2004, and G.992.2, version 3.

7. The hyperframe synchronization processing apparatus according to claim 1, wherein the first frame is a NEXT frame and the second frame is an FEXT frame in at least one of ITU-T Recommendations G.992.2, version from 2004, and G.992.2, version 3.

8. A hyperframe synchronization processing apparatus for establishing synchronization of a hyperframe which has a plurality of first frame groups each including one or a plurality of first frames and a plurality of second frame groups each including one or a plurality of second frames distinguishable from the first frames and in which the first frame groups and the second frame groups appear alternately, the hyperframe synchronization processing apparatus comprising:

- a first difference calculator configured to calculate differences between the number of the first frames included in the respective first frame groups and the number of the second frames included in the respective second frame groups which follow these respective first frame groups in the received hyperframe;
- a first storage configured to sequentially store the differences calculated by the first difference calculator;
- a second difference calculator configured to calculate differences between the number of the second frames included in the respective second frame groups and the number of the first frames included in the respective first frame groups which follow these respective second frame groups in the received hyperframe;
- a second storage configured to sequentially store the differences calculated by the second difference calculator;
- a synchronizer configured to establish the synchronization of the hyperframe by using the differences stored in the first storage and the second storage.

9. The hyperframe synchronization processing apparatus according to claim 8,

- wherein the synchronizer establishes the synchronization of the hyperframe by using a sequence capable of establishing the synchronization of the hyperframe in a shorter period out of:
- a unique sequence capable of specifying a position in the hyperframe out of sequences of the differences between the number of the first frames included in the respective first frame groups and the number of the second frames included in the respective second frame groups which follow these respective first frame groups in the hyperframe; and
- a unique sequence capable of specifying a position in the hyperframe out of sequences of the differences between the number of the second frames included in the respective second frame groups and the number of the first frames included in the respective first frame groups which follow these respective second frame groups in the hyperframe.

10. The hyperframe synchronization processing apparatus according to claim 9, wherein the synchronizer establishes the synchronization of the hyperframe by further using the number of times the first frames and/or the second frames have been received consecutively.

11. The hyperframe synchronization processing apparatus according to claim 8, wherein the first frame is the top frame in the hyperframe.

12. The hyperframe synchronization processing apparatus according to claim 8, wherein the first frame is an FEXT frame and the second frame is a NEXT frame in at least one of ITU-T Recommendations G.992.1, version from 2004, and G.992.2, version 3.

13. A hyperframe synchronization method for establishing synchronization of a hyperframe which has a plurality of first frame groups each including one or a plurality of first frames and a plurality of second frame groups each including one or a plurality of second frames distinguishable from the first frames and in which the first frame groups and the second frame groups appear alternately, the hyperframe synchronization method comprising:

a difference calculating step of calculating differences between the number of the first frames included in the respective first frame groups and the number of the second frames included in the respective second frame groups which follow these respective first frame groups in the received hyperframe;

a storing step of sequentially storing the differences calculated in the difference calculating step; and a synchronizing step of establishing the synchronization of the hyperframe by using the differences stored in the storing step.

14. The hyperframe synchronization method according to claim 13, wherein in the synchronizing step, the synchronization of the hyperframe is established by detecting a unique sequence capable of specifying a position in the hyperframe out of sequences of the differences between the number of the first frames included in the respective first frame groups and the number of the second frames included in the respective second frame groups.

15. The hyperframe synchronization method according to claim 14, wherein in the synchronizing step, the synchronization of the hyperframe is established by further using the number of times the first frames have been received consecutively.

16. The hyperframe synchronization method according to claim 13, wherein the first frame is the top frame in the hyperframe.

17. The hyperframe synchronization method according to claim 13, wherein the second frame is the top frame in the hyperframe.

18. The hyperframe synchronization method according to claim 13, wherein the first frame is an FEXT frame and the second frame is a NEXT frame in at least one of ITU-T Recommendations G.992.1, version from 2004, and G.992.2, version 3.

19. The hyperframe synchronization method according to claim 13, wherein the first frame is a NEXT frame and the second frame is an FEXT frame in at least one of ITU-T Recommendations G.992.1, version from 2004, and G.992.2, version 3.

20. A hyperframe synchronization method for establishing synchronization of a hyperframe which has a plurality of first frame groups each including one or a plurality of first frames and a plurality of second frame groups each including one or a plurality of second frames distinguishable from the first frames and in which the first frame groups and the second frame groups appear alternately, the hyperframe synchronization method comprising:

a first difference calculating step of calculating differences between the number of the first frames included in the respective first frame groups and the number of the second frames included in the respective second frame groups which follow these respective first frame groups in the received hyperframe;

a first storing step of sequentially storing the differences calculated in the first difference calculating step;

a second difference calculating step of calculating differences between the number of the second frames included in the respective second frame groups and the number of the first frames included in the respective first frame groups which follow these respective second frame groups in the received hyperframe;

a second storing step of sequentially storing the differences calculated in the second difference calculating step;

a synchronizing step of establishing the synchronization of the hyperframe by using the differences stored in the first storing step and the second storing step.

21. The hyperframe synchronization method according to claim 20, wherein in the synchronizing step, the synchronization of the hyperframe is established by using a sequence capable of establishing the synchronization of the hyperframe in a shorter period out of:

a unique sequence capable of specifying a position in the hyperframe out of sequences of the differences between the number of the first frames included in the respective first frame groups and the number of the second frames included in the respective second frame groups which follow these respective first frame groups in the hyperframe; and a unique sequence capable of specifying a position in the hyperframe out of sequences of the differences between the number of the second frames included in the respective second frame groups and the number of the first frames included in the respective first frame groups which follow these respective second frame groups in the hyperframe.

22. The hyperframe synchronization method according to claim 21, wherein in the synchronizing step, the synchronization of the hyperframe is established by further using the number of times the first frames and/or the second frames have been received consecutively.

23. The hyperframe synchronization method according to claim 20, wherein the first frame is the top frame in the hyperframe.

24. The hyperframe synchronization method according to claim 20, wherein the first frame is an FEXT frame and the second frame is a NEXT frame in at least one of ITU-T Recommendations G.992.1, version from 2004, and G.992.2, version 3.

* * * * *